United States Patent
Williams et al.

(10) Patent No.: US 11,005,593 B2
(45) Date of Patent: May 11, 2021

(54) SYSTEMS AND METHODS FOR MULTI-CARRIER SIGNAL ECHO MANAGEMENT USING PSEUDO-EXTENSIONS

(71) Applicant: CABLE TELEVISION LABORATORIES, INC, Louisville, CO (US)

(72) Inventors: Thomas H. Williams, Longmont, CO (US); Gregory Charles White, Louisville, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 16/554,336

(22) Filed: Aug. 28, 2019

(65) Prior Publication Data

US 2019/0386772 A1   Dec. 19, 2019

Related U.S. Application Data

(62) Division of application No. 15/833,832, filed on Dec. 6, 2017, now Pat. No. 10,476,631.

(Continued)

(51) Int. Cl.
*H04B 1/707*   (2011.01)
*H04L 1/00*   (2006.01)
(Continued)

(52) U.S. Cl.
CPC ...... *H04L 1/0036* (2013.01); *H04L 25/03019* (2013.01); *H04L 25/03114* (2013.01);
(Continued)

(58) Field of Classification Search
USPC ......... 375/300, 340, 343, 260; 370/330, 201
See application file for complete search history.

(56) References Cited

U.S. PATENT DOCUMENTS

| 5,815,488 A | 9/1998 | Williams et al. |
| 5,886,749 A | 3/1999 | Williams et al. |

(Continued)

OTHER PUBLICATIONS

PCT International Search Report and Written Opinion for related Application No. PCT/US2017/068579, dated Mar. 27, 27, 21 pps.

(Continued)

*Primary Examiner* — Eva Y Puente
(74) *Attorney, Agent, or Firm* — Armstrong Teasdale LLP

(57) ABSTRACT

A receiver is configured to capture a plurality of linearly distorted OFDM symbols transmitted over a signal path. The receiver forms the captured OFDM symbols into an overlapped compound data block that includes payload data and at least one pseudo-extension, processes the overlapped compound block with circular convolution in the time domain using an inverse channel response, or frequency domain equalization, to produce an equalized compound block, and discards end portions of the equalized block to produce a narrow equalized block. The end portion corresponds with the pseudo-extension, and the narrow block corresponds with the payload data. The receiver cascades multiple narrow equalized blocks to form a de-ghosted signal stream of OFDM symbols. The OFDM symbols may be OFDM or OFDMA, and may or may not include a cyclic prefix, which will have a different length from the pseudo-extension.

13 Claims, 15 Drawing Sheets

Related U.S. Application Data

(60) Provisional application No. 62/447,661, filed on Jan. 18, 2017, provisional application No. 62/447,665, filed on Jan. 18, 2017, provisional application No. 62/447,702, filed on Jan. 18, 2017, provisional application No. 62/469,962, filed on Mar. 10, 2017, provisional application No. 62/512,913, filed on May 31, 2017.

(51) Int. Cl.
| | | |
|---|---|---|
| *H04L 27/26* | (2006.01) | |
| *H04L 25/03* | (2006.01) | |
| *H04W 72/04* | (2009.01) | |

(52) U.S. Cl.
CPC ........ *H04L 25/03159* (2013.01); *H04L 27/26* (2013.01); *H04L 27/2605* (2013.01); *H04L 27/2649* (2013.01); *H04B 1/707* (2013.01); *H04L 2025/03414* (2013.01); *H04L 2025/03541* (2013.01); *H04W 72/042* (2013.01)

(56) References Cited

U.S. PATENT DOCUMENTS

| | | | | |
|---|---|---|---|---|
| 8,019,025 | B2* | 9/2011 | Im | H04L 27/2675 |
| | | | | 370/491 |
| 2004/0141457 | A1 | 7/2004 | Seo | H04L 27/2662 |
| | | | | 370/203 |
| 2008/0159420 | A1 | 7/2008 | Tseng | H04L 25/03159 |
| | | | | 375/260 |
| 2009/0060100 | A1 | 3/2009 | Nishio | H04L 27/2662 |
| | | | | 375/344 |
| 2009/0080550 | A1* | 3/2009 | Kushioka | H04J 11/00 |
| | | | | 375/260 |
| 2009/0097394 | A1* | 4/2009 | Huang | H04B 3/32 |
| | | | | 370/201 |
| 2009/0220035 | A1 | 9/2009 | Park | H04L 25/0212 |
| | | | | 375/343 |
| 2013/0039446 | A1* | 2/2013 | Roh | H04L 25/0204 |
| | | | | 375/340 |
| 2014/0198881 | A1* | 7/2014 | Nishikawa | H04L 27/2636 |
| | | | | 375/300 |
| 2016/0006524 | A1 | 1/2016 | McCoy et al. | |
| 2016/0157222 | A1* | 6/2016 | Kerhuel | H04J 13/0059 |
| | | | | 370/330 |
| 2018/0159640 | A1* | 6/2018 | Taher | H04B 17/21 |
| 2020/0052947 | A1* | 2/2020 | Sahin | H04L 27/2636 |

OTHER PUBLICATIONS

Hikmet Sari, Georges Karam, Isabelle Jeanclaude, "Transmission Techniques for Digital Terrestrial TV Broadcasting", IEEE Communications Magazine, Feb. 1995, pp. 100-109.

Nei Wang, Qunbi Zhuge, Yuliang Gao, Meng Qiu, Mohamed Morsy-Osman, Mathieu Chagnon, Xian Xu, David V. Plant, "Low overhead and nonlinear-tolerant adaptive zero-guard-interval CO-OFDM", Optical Society of America, Jul. 15, 2014, vol. 11, No. 15 (13 pgs).

A. Sano et al., "13.4-Tb/s (134×11-Gb/s/ch) No-Guard-Interval Coherent OFDM Transmission over 3,600 km of SMF with 19-ps average PMD", IEEE, Sep. 21-25, 2008, vol. 7—25 (2 pgs).

Riichi Kudo, et al., "Coherent Optical Single Carrier Transmission Using Overlap Frequency Domain Equalization for Long-Haul Optical Systems", Journal of Lightwave Technology, vol. 27, No. 16, Aug. 15, 2009, pp. 3721-3728.

Chen Chen, Qunbi Zhuge, David V. Plant, "Zero-guard-interval coherent optical OFDM with overlapped frequency-domain CD and PMD equalization", Optical Society of America, Apr. 11, 2011, vol. 19, No. 8 (17 pgs).

* cited by examiner

```
float u= 1, ang, mag;
int n1=1, n2=0, Nzc=63;
for(i=0;i<Nzc;i++){//63 terms
    n=(float)i;
    x[i].real=cos((PI*u*(n+n1)*(n+n2))/((float)Nzc));//u=25, 29, or 34
    x[i].imag=-sin((PI*u*(n+n1)*(n+n2))/((float)Nzc));
    ang = atan2(x[i].imag,x[i].real);
    mag = sqrt(x[i].real*x[i].real + x[i].imag * x[i].imag);
    fprintf(file,"%d \t %f \t %f(%f(%f\n", i, x[i].real, x[i].imag, ang, mag);
}
x[63].real = 1.0;
x[63].imag = 0.0;//fill in hole to have 64 points so you can convert to FD
//Ncz =127, 255, 511, (2^n – 1), etc also produce desirable ZC sequences
```

FIG. 9

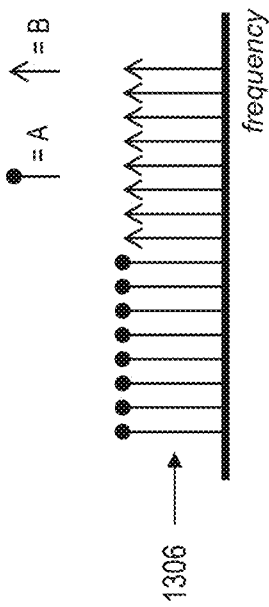
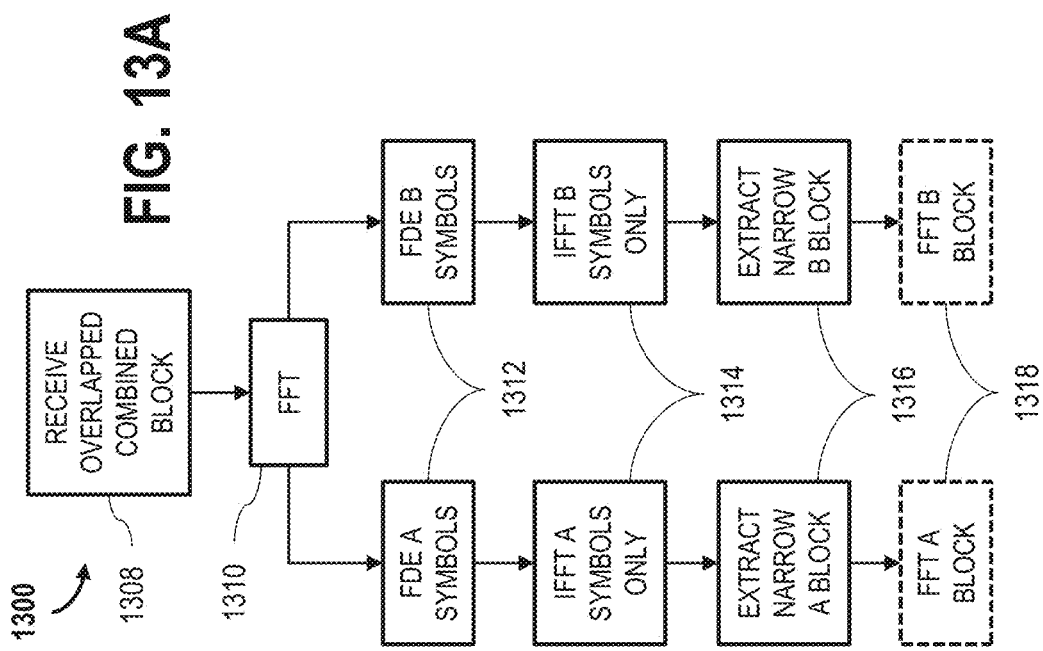

SYSTEMS AND METHODS FOR MULTI-CARRIER SIGNAL ECHO MANAGEMENT USING PSEUDO-EXTENSIONS

CROSS REFERENCE TO RELATED APPLICATIONS

This application is a divisional of U.S. patent application Ser. No. 15/833,832, filed Dec. 6, 2017, which prior application claims the benefit of and priority to U.S. Provisional Patent Application Ser. No. 62/447,661, filed Jan. 18, 2017, U.S. Provisional Patent Application Ser. No. 62/447,665, filed Jan. 18, 2017, U.S. Provisional Patent Application Ser. No. 62/447,702, filed Jan. 18, 2017, U.S. Provisional Patent Application Ser. No. 62/469,962, filed Mar. 10, 2017, and also to U.S. Provisional Patent Application Ser. No. 62/512,913, filed May 31, 2017, the disclosures of all of which are herein incorporated by reference in their entirety.

BACKGROUND

The field of the disclosure relates generally to digital transmission systems, and more particularly, to multi-carrier wired, wireless, and optical digital transmission systems.

Conventional digital transmission systems typically include both linear and non-linear distortion. However, for the purposes of the following discussion, use of the term "distortion" is generally intended to refer to linear distortion only. Conventional digital transmission systems also utilize symbols with coefficients, either in the time domain (TD) or frequency domain (FD), which are generally complex-value sequences. That is, the coefficients of the complex symbols typically include both a real component and an imaginary component, or alternatively, a magnitude and a phase value. Time and frequency domains are related, and the two domains are duals of each other. That is, for a plot or a sequence of numerical values, it must be known whether to observe the plotted numbers as time domain or frequency domain values.

This distinction is of particular significance when considering multi-carrier (MC) digital transmissions, such as with orthogonal frequency division multiplexing (OFDM) and orthogonal frequency division multiple access (OFDMA) transmissions. OFDM symbols, for example, when plotted, appear as discrete values in the frequency domain, but look like random noise in the time domain. In contrast, if a transmission is single carrier (SC), its symbols can be viewed as discrete values in the time domain, but look like random noise in the frequency domain. Thus, multi-carrier and single carrier transmissions are viewed in different domains.

One type of distortion that is known to severely affect digital transmissions is multipath. Multipath linear distortion is sometimes referred to as "echoes," "ghosts," or "dispersion." An example of an echo distortion is shown in FIG. 1A. FIG. 1A is a schematic illustration depicting a conventional transmission system 100. System 100 includes a transmitter 102 with a transmitting antenna 104 and a receiver 106 with a receiving antenna 108. Transmitter 102 modulates a baseband signal onto a carrier, thereby forming an RF signal 110 for communication over a signal path 112 between transmitter 102 and receiver 106. Data over signal path 112 includes telephony, computer code, file data, network data, internet, world wide web (WWW), entertainment video, video phone, security alarm signals, etc. The data may be widely broadcast, or intended for only the single receiver 106. Signal path 112 includes (i) a direct path portion 114, and (ii) an echo path portion 116 that reflects off of a reflecting object 118. Data traveling over direct path portion 114 results in a direct signal portion 120 at receiver 106, and data traveling over echo path portion 116 results in an echo signal portion 122 at receiver 106. Direct signal portion 120 and echo signal portion are collectively received by receiver 106 as a received signal 124.

Thus, the presence of echoes from reflections (e.g., from reflecting object 118) causes received signal 124 to be distorted by the presence of echo signal portion 122 combined with a direct signal portion 120. In some cases, direct path portion 114 may be blocked by an obstruction 126 between transmitter 102 and receiver 106, and the only signal reception possible will be from echo signal portion 122 over echo path portion 116. In many cases, the received signal includes multiple echo signals. If the frequency response of the signal path 112 is measured, the presence of a strong echo will cause ripples in the magnitude of the response, where the reciprocal of the frequency difference between peaks is the time delay of the echo from path 116, relative to the direct signal 120.

On wired signal paths, echoes may alternatively occur from impedance mismatches within coaxial networks. With multipath linear distortion, one or more copies of the original signal—typically with a delay and attenuation—are added to the original signal. On wireless signal paths, the multipath linear distortion, and therefore the attenuated and delayed copies, may be caused by signals reflecting from structures, such as buildings, water towers, etc. In the example of radiated transmissions such as received broadcast analog television pictures, the multipath linear distortion may appear as additional fainter images superimposed on the intended image, along with a typical delay relative to the intended image received over a direct transmission path.

On single mode fiber optic cable using coherent optical signals, the transmission characteristics are different relative to RF (sub-100 GHz) wired and wireless signal paths. For example, a 1550 nm wavelength laser has an optical frequency of 193e12 Hz. In single mode glass fiber, an impairment called Chromatic Dispersion (CD) is encountered, which is similar to group delay encountered, typically from filters, at much lower wired and wireless frequencies. Signals at different frequencies (optical wavelengths) travel at different speeds down the fiber optic cable and this linear distortion needs to be equalized to minimize inter-symbol interference (ISI). This impairment becomes more severe with increasing bandwidth and more severe with longer fiber optic cable spans. This type of signal interference is different from echoes, which are not typically encountered on fiber optic transport media. Coaxial cables and free space, on the other hand, experience virtually no group delay (chromatic dispersion). Thus, CD is created by different wavelengths of a signal traveling at different speeds, whereas echoes are reflected copies of the same signal.

On optical fiber, different polarizations can be used for simultaneous transmission of two different signals, but because fiber cores sometimes have elliptical shapes, as opposed to round shapes, signals with different polarizations travel at different rates, resulting in an impairment that must be removed at the receiver. Satellites and microwave towers also use vertical and horizontal polarizations for signals propagating in free space, but free space propagation does not experience polarization distortions. In some conventional OFDMA and single-carrier frequency-division multiple-access (SC-FDMA) systems, overlapping signals from multiple transmitters are combined from multiple transmitters at RF frequencies. At optical frequencies, however, these overlapping signal techniques experienced optical beat interference (OBI) problem unless the optical signal phase purity is high. Therefore, echo problems are generally encountered on wired and wireless channels, but not on fiber optic cable (e.g., due to use of angled connectors).

In the case of digital transmissions, mild multipath distortion will increase the bit error rate (BER) in the presence of random noise or other additive impairments, and may thus be corrected, whereas un-equalized severe multipath distortion, on the other hand, may render the received data useless for further processing at the receiver end. Other types of linear distortions, such as a non-flat frequency response or a group delay, may also affect or impair digital transmissions. These types of distortions may result from imperfect filters and/or amplifier tilt.

Some conventional techniques have been utilized to eliminate, or at least equalize, multipath linear distortion in the time domain or frequency domain. One conventional time domain technique utilizes an adaptive equalizer to correct for multipath distortion. The adaptive equalizer sums a received distorted signal with a delayed version of the distorted signal, in order to cancel the received echoes. This cancellation process is referred to as equalization, or "de-ghosting." Conventional adaptive equalization schemes sometimes employ a filter architecture such as a finite impulse response (FIR) filter, which utilizes a number of taps (either hardware or software) that are configured to execute a multiply-accumulate operation, and programs coefficients in the adaptive equalizer to cancel received echoes. Such programming may utilize a particular reference signal, also referred to as a training signal or "ghost-canceling" signal, so that the programmed coefficients are computed as an inverse of the channel response. The frequency and the impulse response of the channel may also be determined as intermediate steps, and, in the time domain, tap coefficients are computed as the reciprocal of the impulse response. In some instances, the adaptive equalizer is programmed using blind equalization techniques. An exemplary FIR filter architecture is disclosed in U.S. Pat. No. 5,886,749, which is incorporated by reference herein.

Echoes on cable lines can come in two varieties: single recursion and multiple (infinite) recursion. An infinite recursion occurs, for example, by an echo tunnel as a signal bounces back and forth in the tunnel, getting weaker on each pass. FIG. 1B is a graphical illustration depicting examples of conventional time domain plots 128 for a multiple recursion 130 and a single recursion 132 on an echo signal path, and respective adaptive equalizer solutions (impulse response) 134 implemented to correct the encountered recursion 130 or 132. As shown in illustration 128, the adaptive equalizer solution $134_M$ that corrects multiple recursion echo 130 though, is itself a single recursion. In contrast, where the main signal path experiences single recursion 132 (e.g., as can happen with two signal paths), the adaptive equalizer solution $134_S$ that corrects single recursion echo 132 though, is a multiple recursion. In the conventional systems, multiple recursion solution $134_M$ requires more taps, or more time, than would single recursion solution $134_S$ to remove an echo. If the echo is stronger, even more taps, with significant energy, are required.

Conventional adaptive equalization techniques, however, are significantly limited with respect to complex signals that require processing of a large number of coefficients (e.g., greater than 8 or 64). Because the FIR filter utilizes linear convolution, the rate of required computations increases as the product of the number of taps, multiplied by the clocking speed of the taps. For hardware-implemented taps, a large number of coefficients will significantly increase the cost and size of the physical structure that performs the adaptive equalization. For software-implemented taps, an exponential increase will significantly increase the required processing speed of the programming that performs computations. Large quantities of taps are particularly necessary where, for example, the clock frequency of the equalizer is high, and where a received echo is long.

Some conventional techniques attempt to solve the multiple-computational problems associated with adaptive equalization by taking a received distorted signal in the time domain, separating the time domain signal into blocks, and then transforming the blocks into the frequency domain, such as through use of a fast Fourier transform (FFT). The transformed blocks thus become sets of frequency domain subcarriers, and each frequency domain subcarrier may then be multiplied by a single complex coefficient to remove the associated linear distortion. This process is known as frequency domain equalization (FDE).

Once the linear distortion is removed, the frequency domain blocks are converted back into time domain blocks. A problem occurs, however, if the blocks are contaminated with foreign or extraneous energy, such as might occur from echo energy transporting distortion from a previous block. Conventional systems address this energy transportation problem through use of cyclic prefixes (CP), which are a set of time domain symbols copied from the end of the block and pasted onto the front of the block.

FIG. 2A is a graphical illustration of a time domain signal 200 of a conventional OFDM transmission 202 having a cyclic prefix 204, utilized in accordance with transmission system 100, FIG. 1A. Typically, an OFDM carrier signal is the sum of one or more OFDM symbols, each symbol made up of a plurality of orthogonal subcarriers, and with baseband data on each subcarrier being independently modulated. In an embodiment, OFDM transmission 202 is a carrier signal transmitted using technology such as the Data Over Cable Service Interface Specification (DOCSIS), version 3.1, or one or more of many known and burgeoning wireless standards. As described above, OFDM implements a plurality of different subcarriers, all of which are harmonics of a fundamental, to obtain orthogonality.

DOCSIS specifications conventionally utilize OFDM for downstream signals and OFDMA for upstream signals. OFDM and OFDMA are complimentary. OFDM is typically used in the downstream transmission where there is one transmitter (e.g., a Cable Modem Termination System (CMTS)) sending information to multiple receivers (e.g., cable modems). OFDMA is typically used in the upstream transmission where there are multiple transmitters (e.g., the cable modems) transmitting to one receiver (e.g., the CMTS). The cyclic prefix is therefore commonly used in both OFDM and OFDMA.

The cyclic prefix functions as a "guard time" that separates data bursts, and allows any micro-reflection from one burst to die out before the next burst is received, thereby eliminating interference from one block to the next. The cyclic prefix is therefore considered particularly essential over an HFC network, where reflections frequently occur. Reflections are often created by impedance mismatches on the HFC network and result from a number of issues, including manufacturing tolerances of passive hardware such as taps, power inserters, and splitter, active hardware such as amplifiers, and connectors. Combined multiple micro-reflections therefore, create linear distortions, which cause a number of impairments to signal transmission, including amplitude ripple (standing waves), group delay ripple, inter-symbol interference, and degraded modulation error ratio (MER) on digital signals transmitted on the HFC network. For a conventional multicarrier equalization processes, the cyclic prefix should be longer than any echo in the signal path. Accordingly, various durations of cyclic prefixes are utilized to accommodate a variety of echo delays in the HFC network, thereby significantly increasing the overhead of the network, but without carrying any useful customer information in the transmission of the cyclic prefix.

OFDM transmission 202 includes, for example, first harmonic subcarrier 206, second harmonic subcarrier 208, third harmonic subcarrier 210, and fourth harmonic subcarrier 212. For ease of explanation, only four such subcarriers of OFDM transmission 202 are illustrated, but typically, many more subcarriers exist. Each of the harmonically-related subcarriers 206, 208, 210, 212 may have different magnitude and phase values. When all four subcarriers 206, 208, 210, 212 are combined, or summed, for transmission, the summed result is a single composite signal 214.

Orthogonality allows each of the original subcarriers to be separated at the receiver (e.g., receiver 106, FIG. 1), such as with utilization of Fourier processes. That is, a discrete Fourier transform (e.g., an FFT) converts a set of time domain values into frequency domain values, and an inverse discrete Fourier transform (e.g., an IFFT) converts frequency domain values into time domain values. The larger the transform, the greater is the efficiency improvement by using an FFT, as opposed to a simple discrete Fourier transform. The FFT block sizes may be efficiently implemented with a block size of radix 2 ($2^n$, where n is an integer), such as 256, or 1024, but other efficient transform block sizes are possible. Cyclic prefix 204 is created by copying symbols from an end region 216 (shown shaded in gray) of composite signal 214, and pasting the copied signals onto the beginning region thereof as a guard interval. Cyclic prefix 204 thus allows circular convolution or FDE to be performed on OFDM transmission 202, without suffering interference from a previous OFDM block if there is an echo on the channel. However, for this example, it is assumed that the echo is shorter than cyclic prefix 204.

FIG. 2B is a graphical illustration of a frequency domain signal 218 of OFDM transmission 202, FIG. 2A. That is, frequency domain signal 218 represents a spectral plot of OFDM transmission 202 in the frequency domain. Frequency domain signal 218 may be obtained by performing a discrete Fourier transform or an FFT on composite time domain signal 214, FIG. 2A. As illustrated in FIG. 2B, each of time domain harmonic subcarriers 206, 208, 210, 212 has a respective frequency domain component subcarrier 220, 222, 224, 226, each having both a magnitude and a phase value. Under these conventional techniques, OFDM transmissions may be viewed in either the time domain or the frequency domain. However, composite signal 214 appears noise-like, or random in the time domain, which is problematic for multiple-carrier symbols. In comparison, some single-carrier symbols, such as single-carrier frequency-division multiple-access (SC-FDMA) can also be viewed either in the time domain or the frequency domain, but such single-carrier symbols resemble noise when viewed in the frequency domain. Accordingly, it is desirable to develop systems and methods capable of receiving, equalizing, and utilizing the same multiple-carrier or multiple-access symbols in both the time domain and the frequency domain.

Cyclic prefixes provide block-to-block isolation, and thus transmission of digital information is often performed with blocks of data. Some conventional systems use linear code, such as a Reed-Solomon code or Low-Density Parity Check (LDPC) codes, for purposes of forward error correction (FEC), which allows a percentage of erred symbols to be corrected by the code. Use of cyclic prefixes, however, requires additional resources to transmit the extra data that constitutes the cyclic prefix. The required cyclic prefix data reduces the bandwidth efficiency of transmissions, thereby limiting the amount of data that can be transmitted within a given frequency band, while also requiring additional power and decreasing the battery life of system components. Moreover, as described above, cyclic prefixes are not completely effective in the case where the cyclic prefix portion of time domain data is shorter than the length, or duration, of a received echo.

BRIEF SUMMARY

In an embodiment, a signal equalizing receiver is configured to capture a plurality of OFDM symbols transmitted over a signal path adding linear distortion to the plurality of OFDM symbols, and form the plurality of captured OFDM symbols into an overlapped compound data block. The compound data block includes at least one pseudo-extension in addition to payload data from at least one of the plurality of OFDM symbols. The receiver is further configured to process the overlapped compound data block with one of (i) a circular convolution having an inverse channel response in the time domain, and (ii) a frequency domain equalization in the frequency domain, to produce an equalized compound block, and discard at least one end portion of the equalized compound block to produce a narrow equalized block. The at least one end portion corresponds with the at least one pseudo-extension, and the narrow equalized block corresponds with the payload data. The receiver is further configured to cascade two or more narrow equalized blocks to form a de-ghosted signal stream of the plurality of OFDM symbols. The plurality of OFDM symbols includes one or more of an OFDM transmission and an OFDMA transmission. The plurality of OFDM symbols further includes one or more of a cyclic prefix and no cyclic prefix. A length of the at least one pseudo extension is different than a length of the cyclic prefix.

In an embodiment, a digital transmission receiver has a processor and a memory. The receiver is configured to receive a digital signal transmission from a signal path including a plurality of data blocks having linear distortion, determine, from the signal path of the digital signal transmission, a duration of at least one reflection of the digital signal transmission on the digital signal path, and attach a pseudo-extension to a first data block of the plurality of data blocks. The length of the pseudo-extension in the time domain is greater than the duration of the at least one reflection. The receiver is further configured to process the first data block, together with the pseudo-extension attached thereto, to remove linear distortion from the first data block, and discard the processed pseudo-extension from the processed first data block after the linear distortion has been removed.

In an embodiment, a digital transmission system includes a transmitter configured to transmit orthogonal frequency-division multiplexing (OFDM) symbols having no cyclic prefix attached thereto, a receiver for receiving the transmitted OFDM symbols from the transmitter, and a signal path for communicating the transmitted OFDM symbols from the transmitter to the receiver. The OFDM symbols received by the receiver include linear distortion from the signal path, and the receiver is configured to process the received OFDM symbols and linear distortion using an overlapped circular convolution function to produce equalized OFDM symbols.

In an embodiment, a digital transmission system includes a transmitter configured to transmit orthogonal frequency-division multiplexing (OFDM) symbols having no cyclic prefix attached thereto, a receiver for receiving the transmitted OFDM symbols from the transmitter, and a signal path for communicating the transmitted OFDM symbols from the transmitter to the receiver. The OFDM symbols received by the receiver include linear distortion from the signal path, and the receiver is configured to process the received OFDM symbols and linear distortion by an overlapped Fourier transform function to produce equalized OFDM symbols. The overlapped Fourier transform function is configured to (i) overlap individual ones of the distorted OFDM symbols with overlapped time energy from respectively adjacent ones of the distorted OFDM symbols, (ii) transform the overlapped individual distorted OFDM symbols into distorted frequency domain symbols, (iii) perform complex multiplication of the distorted frequency domain symbols by equalization coefficients to equalize the distorted frequency domain symbols, (iv) remove the overlapped time energy from a time domain component of the equalized frequency domain symbols, and (v) produce undistorted frequency domain symbols from a frequency domain component of the time domain component with the overlapped time energy removed.

In an embodiment, a digital transmission system includes a transmitter configured to transmit (i) a series of orthogonal frequency-division multiplexing (OFDM) symbols having no cyclic prefix attached thereto, and (ii) at least one constant amplitude zero autocorrelation waveform sequence (CAZAC) sequence. The system further includes a receiver for receiving the transmitted series of OFDM symbols and the CAZAC sequence from the transmitter, and a signal path for communicating the transmitted series of OFDM symbols and CAZAC sequence from the transmitter to the receiver. The series of OFDM symbols and the CAZAC sequence are received by the receiver with linear distortion from the signal path, and the receiver is configured to utilize the received CAZAC sequence as a reference signal for equalizing the received series of OFDM symbols.

In an embodiment, a method of equalizing a transmitted digital signal includes steps of receiving, in the time domain, a sequential series of first, second, and third data blocks of the transmitted digital signal, forming a compound block in the time domain from the second data block including an end portion of first data block and a leading portion of the third data block, performing circular convolution on the compound block using a set of equalization coefficients to equalize the compound block in the time domain, extracting from the equalized compound block a narrow block corresponding to equalized time domain data of the second data block, converting the narrow block from the time domain into frequency domain data, and reading frequency domain symbols relating to the second data block from the converted narrow block.

In an embodiment, a method of equalizing a transmitted digital signal includes steps of receiving, in the time domain, a sequential series of time domain samples of the transmitted digital signal, forming the received sequential series of time domain samples into a separate sub-series of overlapping compound time domain blocks, wherein each compound time domain block of the sub-series includes a pseudo-prefix comprising information from an immediately preceding block, determining an echo delay on the signal path, converting the compound blocks into the frequency domain to form compound frequency domain blocks, equalizing the compound frequency domain blocks to form equalized frequency domain blocks, converting the equalized frequency domain blocks into the time domain to form equalized time domain compound blocks, discarding, from the equalized time domain compound blocks, overlapping time domain energy portions corresponding to respective equalized pseudo-prefixes, to form narrow equalized blocks, pasting the narrow equalized blocks together to form a composite equalized time domain signal, and converting the composite equalized time domain into the frequency domain and read equalized frequency domain symbols therefrom.

BRIEF DESCRIPTION OF THE DRAWINGS

These and other features, aspects, and advantages of the present disclosure will become better understood when the following detailed description is read with reference to the following accompanying drawings, in which like characters represent like parts throughout the drawings.

FIG. 9 is a computer program listing demonstrating an exemplary coding for implementing the Zadoff Chu sequence depicted in FIG. 8.

FIG. 13A is a flow diagram depicting an alternative process for operating the receiver depicted in FIG. 3.

FIG. 13B is a graphical illustration depicting alternative frequency plots of subcarrier schemes that may be implemented with the process depicted in FIG. 13A.

Figure 1A:
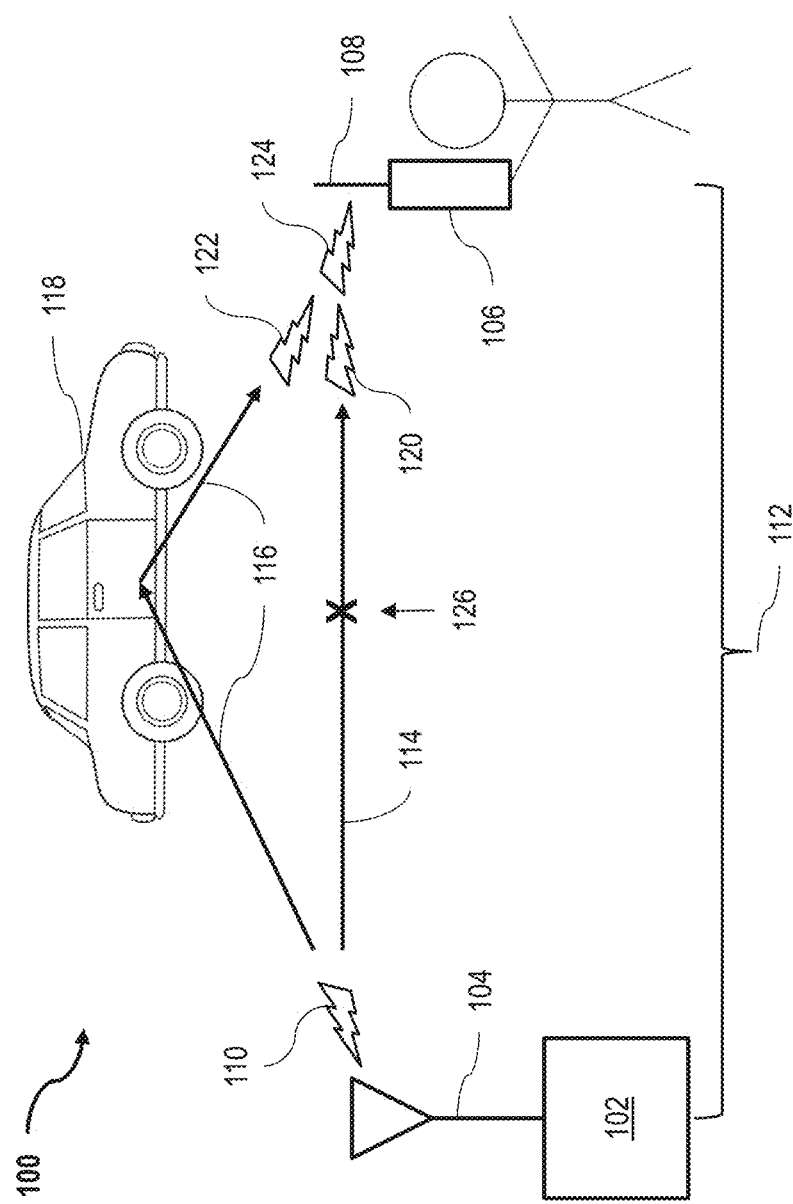
FIG. 1A is a schematic illustration depicting a conventional transmission system.
Figure 1B:
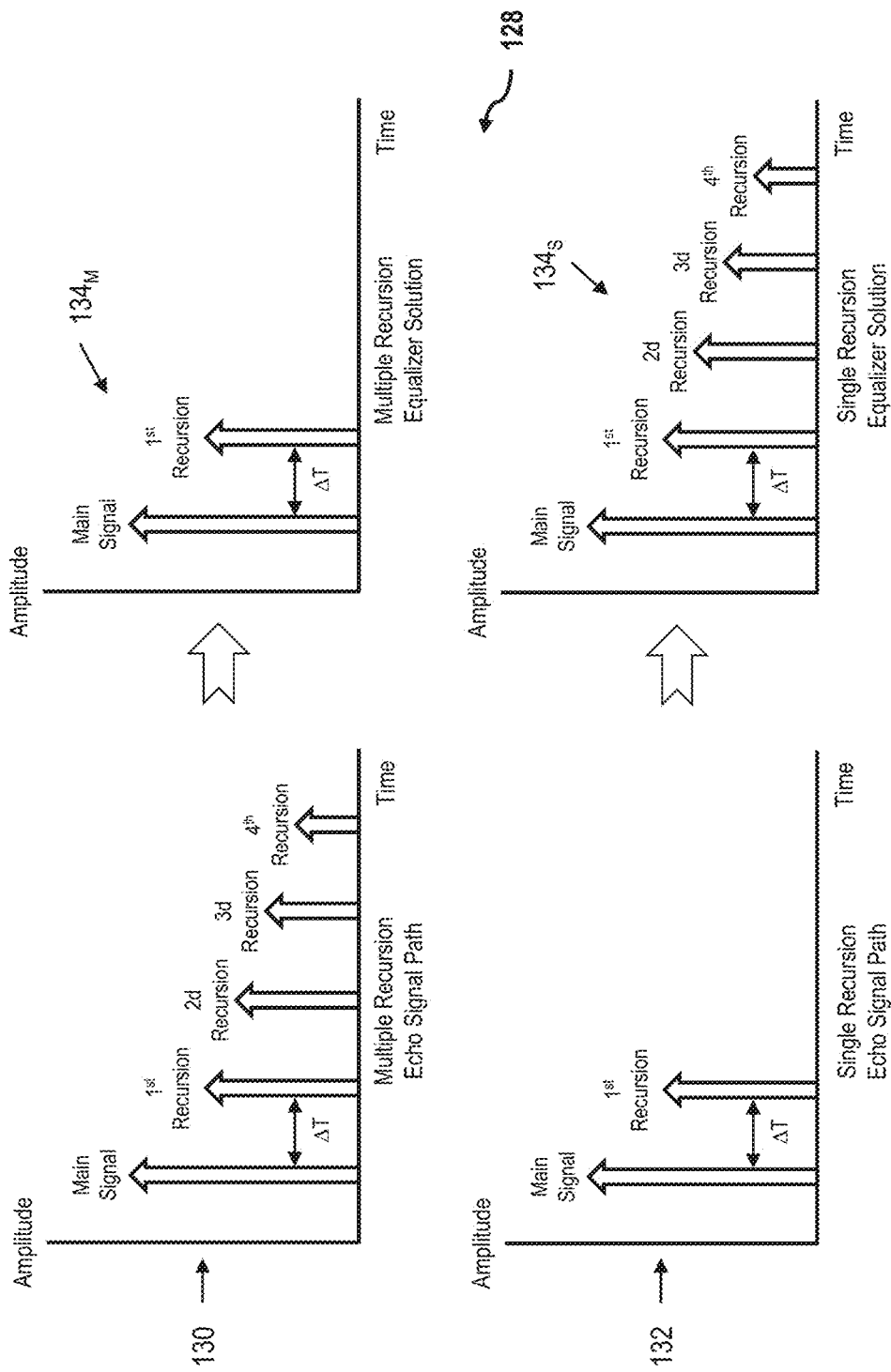
FIG. 1B is a graphical illustration depicting examples of conventional time domain plots for a multiple recursion and a single recursion echoes on a signal path, and respective adaptive equalizer solutions implemented to correct the encountered recursion.
Figures 2A, 2B:
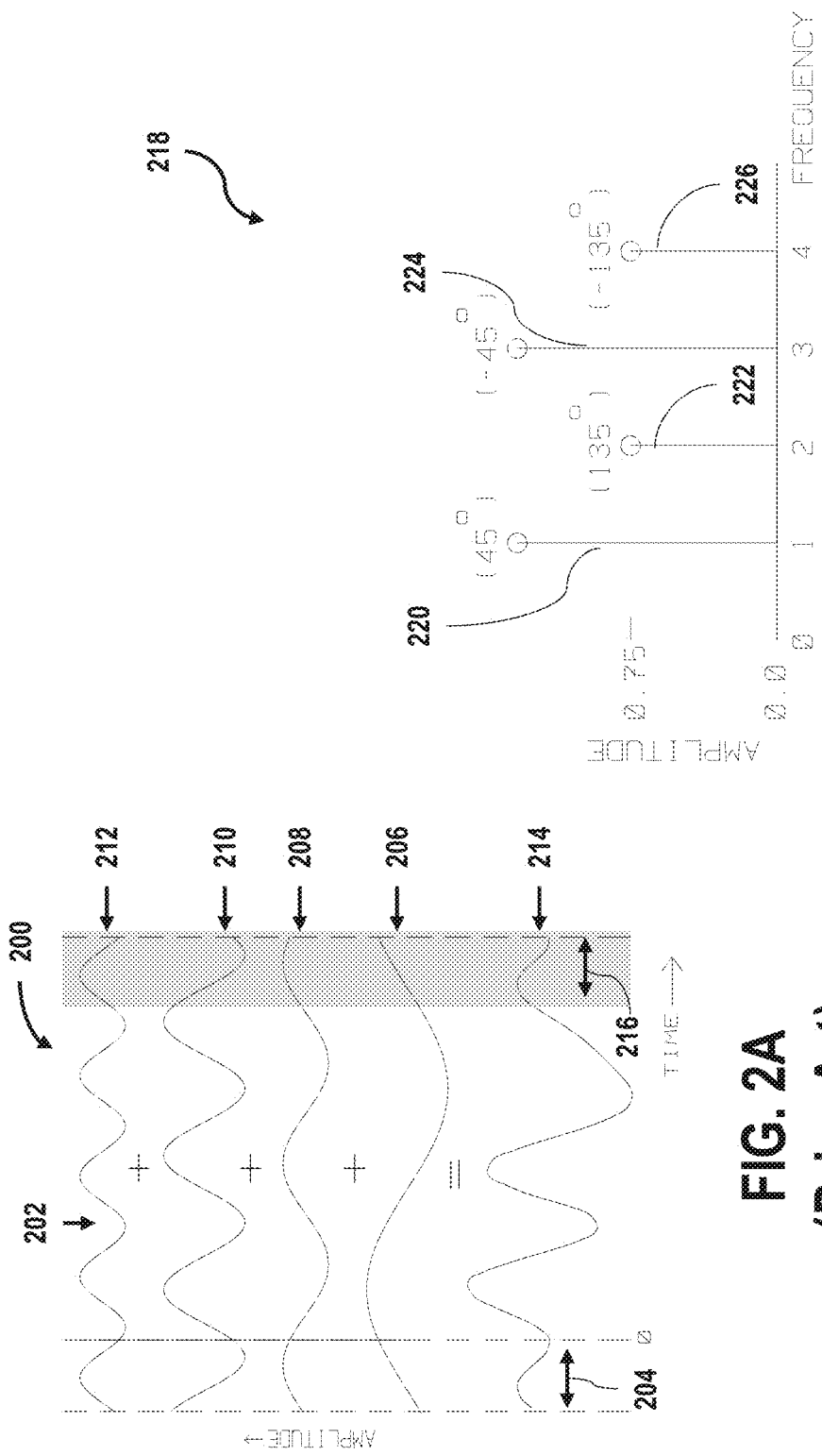
FIG. 2A is a graphical illustration of the time domain signal of a conventional OFDM transmission having a cyclic prefix, utilized in accordance with the example depicted in FIG. 1.
FIG. 2B is a graphical illustration of the frequency domain signal of the conventional OFDM transmission depicted in FIG. 2A.

Unless otherwise indicated, the drawings provided herein are meant to illustrate features of embodiments of this disclosure. These features are believed to be applicable in a wide variety of systems including one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit (ASIC), and other programmable circuits, and these terms are used interchangeably herein. In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Further, as used herein, the terms "software" and "firmware" are interchangeable, and include any computer program storage in memory for execution by personal computers, workstations, clients, and servers.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

Furthermore, as used herein, the term "real-time" refers to at least one of the time of occurrence of the associated events, the time of measurement and collection of predetermined data, the time for a computing device (e.g., a processor) to process the data, and the time of a system response to the events and the environment. In the embodiments described herein, these activities and events occur substantially instantaneously.

As described herein, signal equalization in the time domain may be performed at a receiver by capturing symbols of the received symbol into an overlapped compound block and circularly convolving the compound block with an inverse channel response to produce an equalized compound block. End portions of the equalized compound block may then be discarded to produce a narrow equalized block, and a plurality of such narrow equalized blocks may further then be cascaded to form a de-ghosted signal stream. Alternatively, the overlapped compound block may be processed in the frequency domain using frequency domain equalization. In an exemplary embodiment, cyclic prefixes are not sent on OFDM or OFDMA multicarrier transmissions. In alternative embodiments, the present techniques may be implemented on any type of linearly distorted modulation transmission without a cyclic prefix (also known as guard intervals or cyclic extensions), or transmissions using relatively short cyclic prefixes.

In the exemplary embodiment, systems and methods herein are configured to transmit OFDM and OFDMA signals through wired and wireless channels without considering, or having to create, cyclic prefixes. In some embodiments, overlapped circular convolutions are performed at the receiver end of the system to eliminate linear distortion, such as echoes. In such embodiments, the overlapped circular convolution may be programmed with equalization coefficients obtained, for example, from pilot subcarriers or from a training-synchronization signal, such as a constant amplitude zero autocorrelation (CAZAC) signal. Each received frequency coefficient may then be corrected by a single complex multiplication to correct the respective magnitude and phase. In at least one embodiment, a Zadoff Chu sequence functions as the training-synchronization signal.

In other embodiments, overlapped Fourier transforms and inverse Fourier transforms are performed at distinct signal conversion stages, and the pseudo-prefixes are determined at the receiver end of the system according to predetermined pilot/training signals, or from other signal energy received from the transmitter. For example, irrespective of whether a transmitter creates a new cyclic prefix to serve as a guard interval between transmitted data, the present systems and methods utilize the receiver to determine a pseudo-prefix from random or noise-like portions of the transmission (by performing an autocorrelation), or from training signals, or pilots. Therefore, the present systems and methods are equally effective for receiving digital transmissions that include, or do not include, cyclic prefixes from the transmitter. Accordingly, by eliminating (or ignoring) the need for cyclic prefixes, the bandwidth efficiency of transmissions may be increased to allow a frequency band to transport more data within a time-frequency resource, and thereby reduce power consumption and increase the battery life of system components.

The embodiments herein are of also of particular use with respect to OFDM signals, which are sent in blocks, and include a number of harmonics that are orthogonal to each other because of their integer relationship to a fundamental frequency. By varying the phase and the magnitude of the harmonics, information can be transmitted while preserving the orthogonality between each of the harmonics. As described in greater detail below, echoes may affect OFDM signals, but can be corrected in the frequency domain. Conventional systems only correct for the effects of interblock distortion by using a time domain cyclic prefix. Correction schemes using cyclic prefixes, however, are only fully effective if the delay of the echo is shorter than the duration of the cyclic prefix/guard interval. In multi-carrier transmission schemes though, the length of echo delay can vary from receiver to receiver, or according to the respective distances from reflection points in a signal path. The present embodiments address and solve this multicarrier echo variance problem by pseudo-prefix determination at the receiver end.

As described herein, transmission efficiency is increased by eliminating the cyclic prefix from transmitted OFDM or OFDMA blocks. Alternatively, reception efficiency may also be increased by configuring the receiver such that the cyclic prefix may be disregarded, if a CP is included in a digital transmission from the transmitter. In an exemplary embodiment, equalization is accomplished in the time domain through use of an overlapped circular convolution process, which overlaps a selected block with surrounding information to form a larger compound, or "fat," block. The compound block is then circularly-convolved with programmed time domain coefficients to remove distortion, and thus equalize the compound block. After equalization, the compound block is "trimmed" into an equalized narrow block, which is then converted into the frequency domain. OFDM symbols may then be determined from the equalized, narrow, converted frequency domain block.

In an alternative embodiment, the cyclic prefix is eliminated in the frequency domain through use of an overlapped Fourier transform. In this alternative process, a large compound time domain block of an OFDM carrier is transformed into the frequency domain, and then equalized by complex multiplication FDE sub-process. This equalized compound frequency domain block is transformed back into the time domain, and then trimmed to form an equalized, time domain, narrow block. In an exemplary embodiment, because the original signal is an OFDM transmission, and additional Fourier transform (e.g., an FFT) is performed on the narrow block so that the OFDM symbols may be determined.

Use of cyclic prefixes is known in the art to provide more than only block-to-block isolation. For example, if a received signal is cross-correlated with a delayed copy of itself, a phase shift on a resulting correlation peak will reveal any offset frequency between the transmitter and the receiver, and correction may then be applied. However, as described further below, this additional functionality from the cyclic prefix is advantageously replaced by a constant amplitude zero autocorrelation (CAZAC) function signal, such as a Zadoff Chu sequence. In some embodiments, the Zadoff Chu sequence is implemented together with channel characterization for further equalization purposes, as well as block timing information.

Overlapped Circular Convolution

Figure 3:
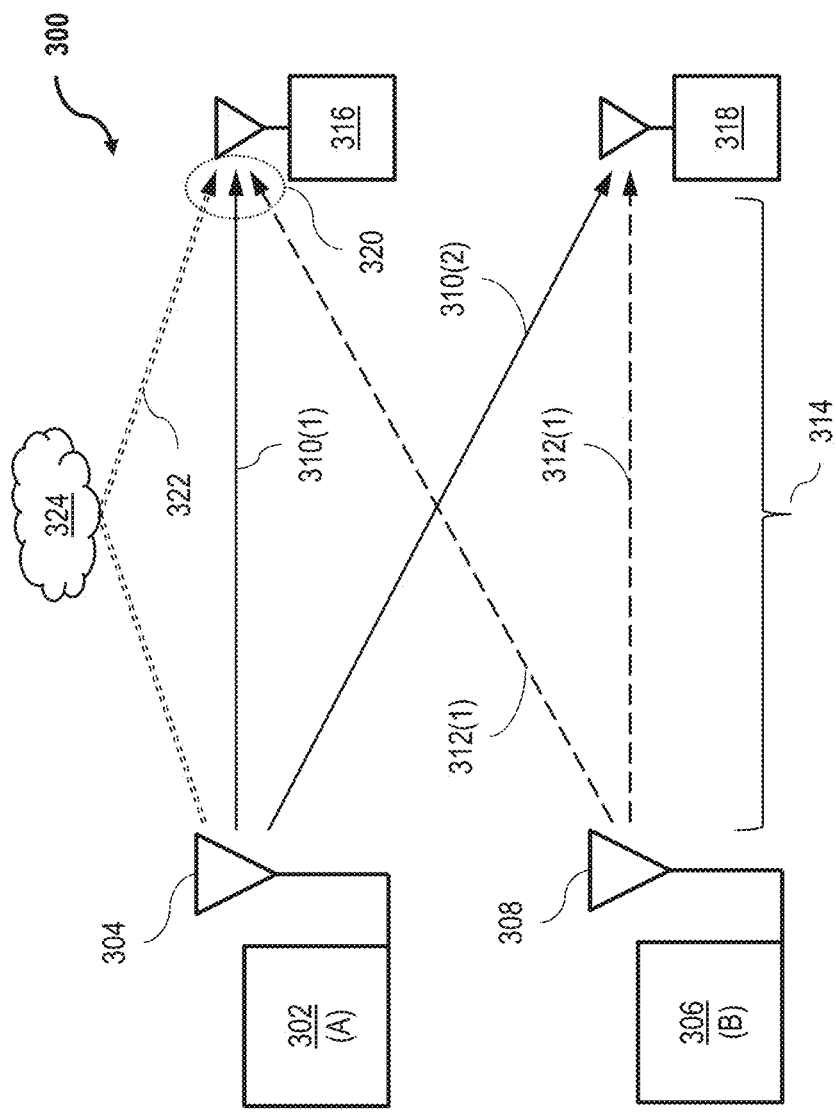
FIG. 3 is a schematic illustration depicting an exemplary multi-carrier transmission system, according to an embodiment.

FIG. 3 is a schematic illustration depicting an exemplary multi-carrier transmission system 300. System 300 includes a first transmitter 302 having a first transmitting antenna 304 and a second transmitter 306 having a second antenna 308. First and second transmitters 302, 306 transmit first and second carrier signals 310, 312, respectively, over communication channels 314 to a first receiver 316 and a second receiver 318. In the example shown in FIG. 3, two receivers and two transmitters are illustrated for simplicity of explanation. In operation, many more transmitters and/or receivers may be implemented within system 300.

Alternatively, the embodiments described herein advantageously operate in the case where multiple receivers are receptive to different carrier signals from multiple transmitters and also in the case where a multiple transmitters deliver a number of different carrier signals to a plurality of antennas (e.g., multiple-input/multiple-output (MIMO). Accordingly, communication channel 314 may include wired signal paths, wireless signal paths, or combination of both. In the example shown in FIG. 3, first receiver 316 receives a composite signal 320. In at least some embodiments, composite signal 320 further includes at least one echo 322 of first carrier signal 310(1), reflected off of a reflecting object 324. For ease of explanation, potential reflections of first carrier signal 310(2) and second carrier signal 312 are not shown.

Figure 4:
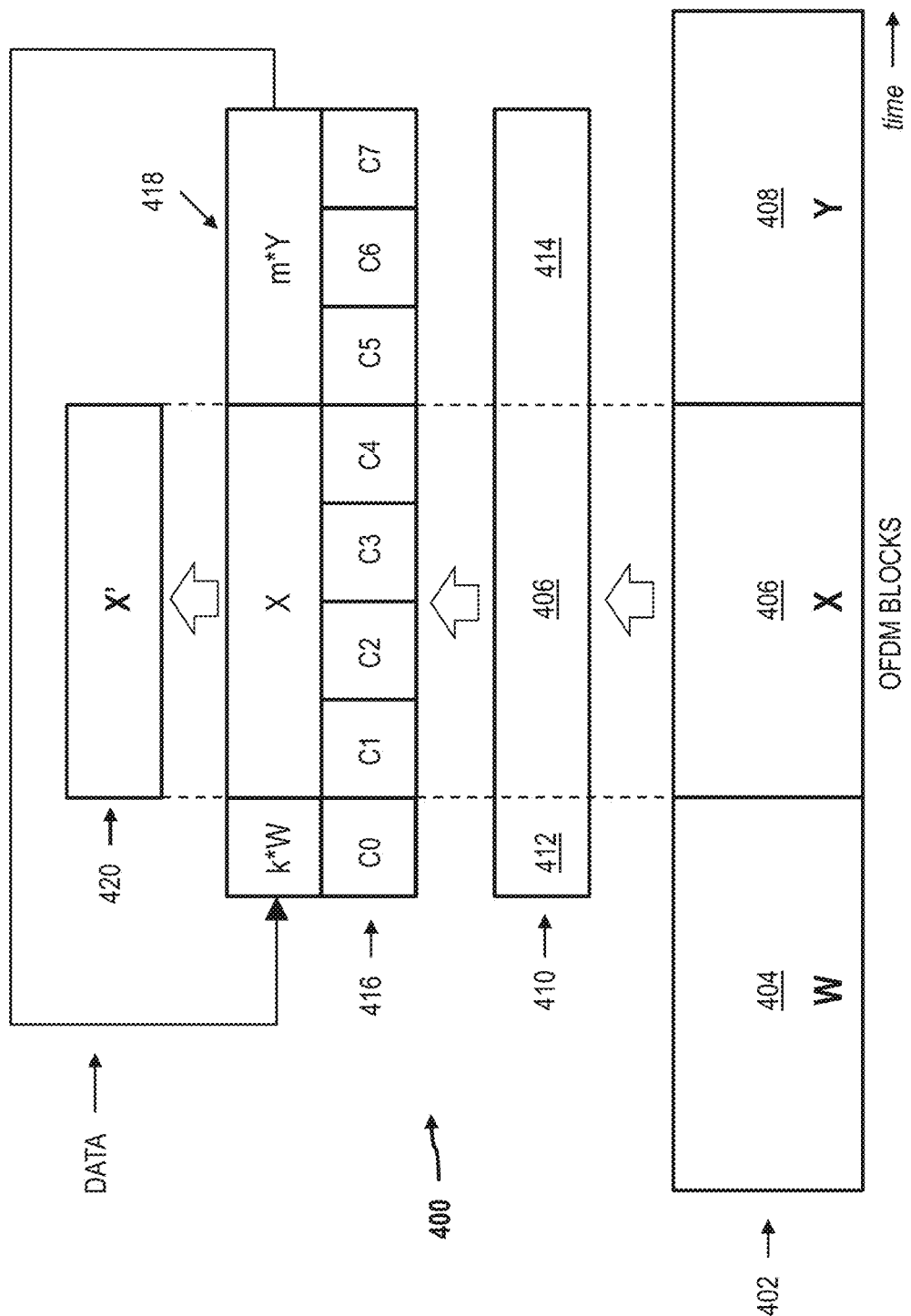
FIG. 4 is a schematic illustration depicting an exemplary equalization scheme for an OFDM symbol without a cyclic prefix, utilizing overlapped circular convolution, in an embodiment.

FIG. 4 is a schematic illustration depicting an exemplary equalization scheme 400 for equalizing an OFDM symbol without a cyclic prefix, utilizing overlapped circular convolution. In an exemplary embodiment, equalization scheme 400 is implemented by a receiver or a processor thereof (e.g., first receiver 316, FIG. 3), and equalization is performed in the time domain. A received time domain OFDM carrier signal 402 includes a series of time domain blocks 404, 406, 408, which are labeled herein as "W" block 404, "X" block 406, "Y" block 408, respectively. Each of W block 404, X block 406, and Y block 408 contains potential distortion, and includes OFDM data symbols, but no cyclic prefixes. For ease of explanation, only three blocks are shown in this example; however, OFDM carrier signal 402 may include significantly more blocks in the series, or be continuous in the time domain.

In operation, the receiver/processor selects X block 406, and forms a compound block 410, which includes all of X block 406, an end portion 412 of W block 404, and a beginning portion 414 of Y block 408. In this example, end portion 412 and beginning portion 414 are illustrated to be one fraction (k) of W block 404 and a different fraction (m) of Y block 408, respectively. Nevertheless, a person of ordinary skill in the art will understand that end portion 412 and beginning portion 414 may constitute larger or smaller portions of the respective origin blocks, equal portions, or portions of unequal length. End portion 412 thus functions as a pseudo-prefix, in the time domain, for X block 406. Pseudo-prefixes function differently from conventional cyclic prefixes. Whereas a conventional cyclic prefix for X block 406 would require a repetition of information from the trailing portion of the X block itself, the present pseudo-prefix is based on information from the preceding W block 404, and therefore requires no repetitive data. In a similar manner, beginning portion 414 of the following Y block 408 functions as a "pseudo-suffix" in the time domain for X block 406. Pseudo-prefixes and pseudo-suffixes are generally referred to herein as "pseudo-extensions." In this example, blocks W, X, and Y are all subject to a same linear distortion.

In further operation, compound block 410 is convolved with equalization coefficients 416 (eight coefficients, C0-C7, are illustrated; however much larger numbers of coefficients, e.g., 64 or more, may be processed according to this embodiment) to form an equalized convolution block 418, which remains in the time domain. That is, each term in compound block 410 is multiplied by the respective coefficient 416 determine beneath it, and the products are summed. A circular shift (to the right, as illustrated in FIG. 4) of the top row (i.e., compound block 410) is performed, in the process is repeated until the circular convolution is complete. Data from equalized convolution block 418 is subjected to one or more circular convolutions. Nevertheless, the size of equalized convolution block 418 remains the same before and after the circular convolution process(es). After circular convolution, symbols from end portion 412 and beginning portion 414 (associated with W block 404 and Y block 408, respectively) are trimmed from equalized convolution block 418 to form a narrow equalized block 420, or X' block 420, which represents a de-ghosted version of X block 406. That is, the time domain pseudo-prefix and pseudo-suffix information is removed, and X' block 420 may then be converted into the frequency domain, after which the OFDM symbols may be determined (step not illustrated).

In an exemplary embodiment, equalization scheme 400 is implemented sequentially for each of the series of distorted time domain blocks 404, 406, 408. That is, after the formation of X' block 418, equalization scheme 400 similarly forms a compound block (not shown) from Y block 408 (e.g., using portions from preceding X block 406 and a following (Z) block, also not shown), and performs circular convolution thereupon to create an equalized Y' block (not shown) nominally using the same coefficients. In an alternative embodiment, equalization scheme 400 may be performed on individual blocks of OFDM carrier signal 402 non-sequentially, that is, Y block 408 may be equalized before W block 404. In at least one embodiment, some blocks of OFDM carrier signal 402 may be equalized, while equalization is not performed other blocks according to equalization scheme 400. Conventional (non-overlapped) multi-carrier technology of OFDM encounters problems in the implementation of circular convolutions, in that extraneous energy from one block contaminates adjacent blocks. According to the embodiments described herein, this inter-symbol interference is eliminated.

According to equalization scheme 400, which uses an overlapped circular convolution, linear distortion may be removed from any received signal in the time domain irrespective of whether the received signal contains a CP, and irrespective of the underlying modulation used. The received signal may be viewable in the time domain (e.g., single-carrier or SC-FDMA), or in the frequency domain (e.g., OFDM and OFDMA), spread-spectrum or wavelet based. In some embodiments, pseudo-extensions 412, 414 may be or include quiet time, another type of signal suffering the same linear distortion, an unused cyclic prefix, or a training signal. The signal may even be a baseband, such as an audio signal having an echo. In the exemplary embodiment, the pseudo-extensions are longer than the relevant encountered echo and all recursions in the echo solution. That is, the respective pseudo-prefix is longer than the trailing echo(es), and the respective pseudo-suffix is longer than the leading echo(es) plus recursions.

Figure 5:
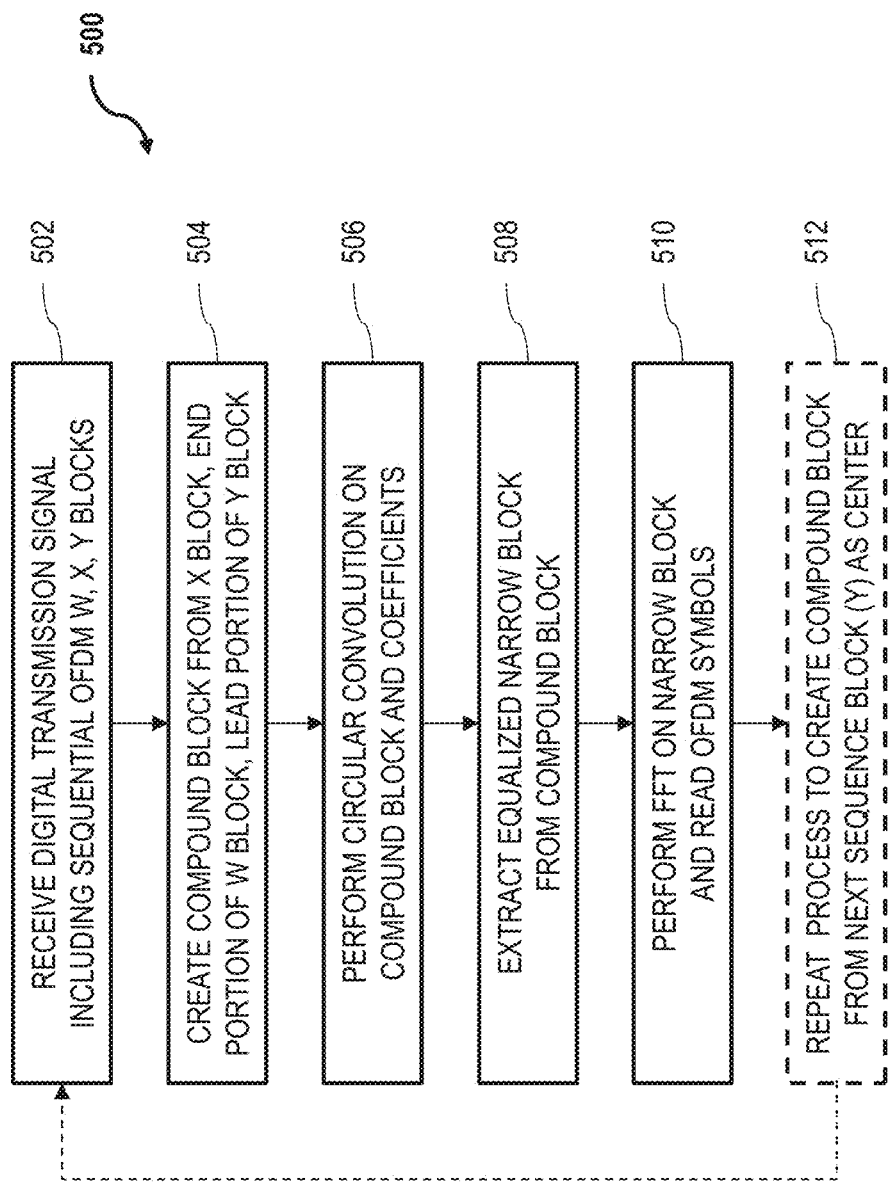
FIG. 5 is a flow chart diagram of an exemplary circular convolution process for the embodiment depicted in FIG. 4.

FIG. 5 is a flow chart diagram of an exemplary circular convolution process 500 for equalization scheme 400, FIG. 4. In the exemplary embodiment, process 500 is implemented by a receiver or the processor thereof (e.g., first receiver 316, FIG. 3), and the equalization similarly occurs in the time domain with an overlapped circular convolution. Process 500 begins at step 502, in which a digital transmission signal (e.g., OFDM carrier signal 402, FIG. 4) is received, including a series of sequential OFDM W, X, Y blocks (e.g., time domain blocks 404, 406, 408, FIG. 4). In step 504, a compound block (e.g., compound block 410, FIG. 4) is created from the entirety of the X block, an end portion of the W block, and the beginning/lead portion of the Y block. In step 506, circular convolution is performed on the compound block and its respective coefficients (e.g., coefficients 416, FIG. 4). In step 508, an equalized narrow block (e.g., narrow block 418, FIG. 4) is extracted from the compound block by trimming/discarding the W (pseudo-prefix) and Y (pseudo-suffix) portions of the convolved compound block. In step 510, the equalized narrow block is converted into the frequency domain (e.g., by an FFT), and the OFDM symbols are read from the frequency-converted narrow block. In step 512, steps 502 through 510 are optionally repeated for the next block in the sequence. That is, in step 512, a compound block is formed from the entirety of the Y block, together with portions of the unequalized X block and "Z" block, to create an equalized Y' block. Alternatively, in step 512, a distorted block other than the Y block may be equalized. If step 510 is optionally eliminated, and the signal being received is single-carrier, the narrow block will contain the equalized time domain symbols.

The present embodiments thus overcome the known problems associated with the use of cyclic prefixes, described above. By implementing the present processing techniques at the receiver end, a digital signal transmission system is able to overcome failures that would occur in a multi-carrier scenario when a cyclic prefix is too short, that is, has a shorter duration than an echo/reflection in the time domain. When the cyclic prefix is too short, the conventional receiver may fail. In contrast, by implementing a pseudo-prefix that is adjustable in time and adjustable according to echo duration, the receiver according to the present systems and methods will continue to function irrespective of the length—or existence—of the cyclic prefix.

Overlapped Fourier Transform

Figure 6A:
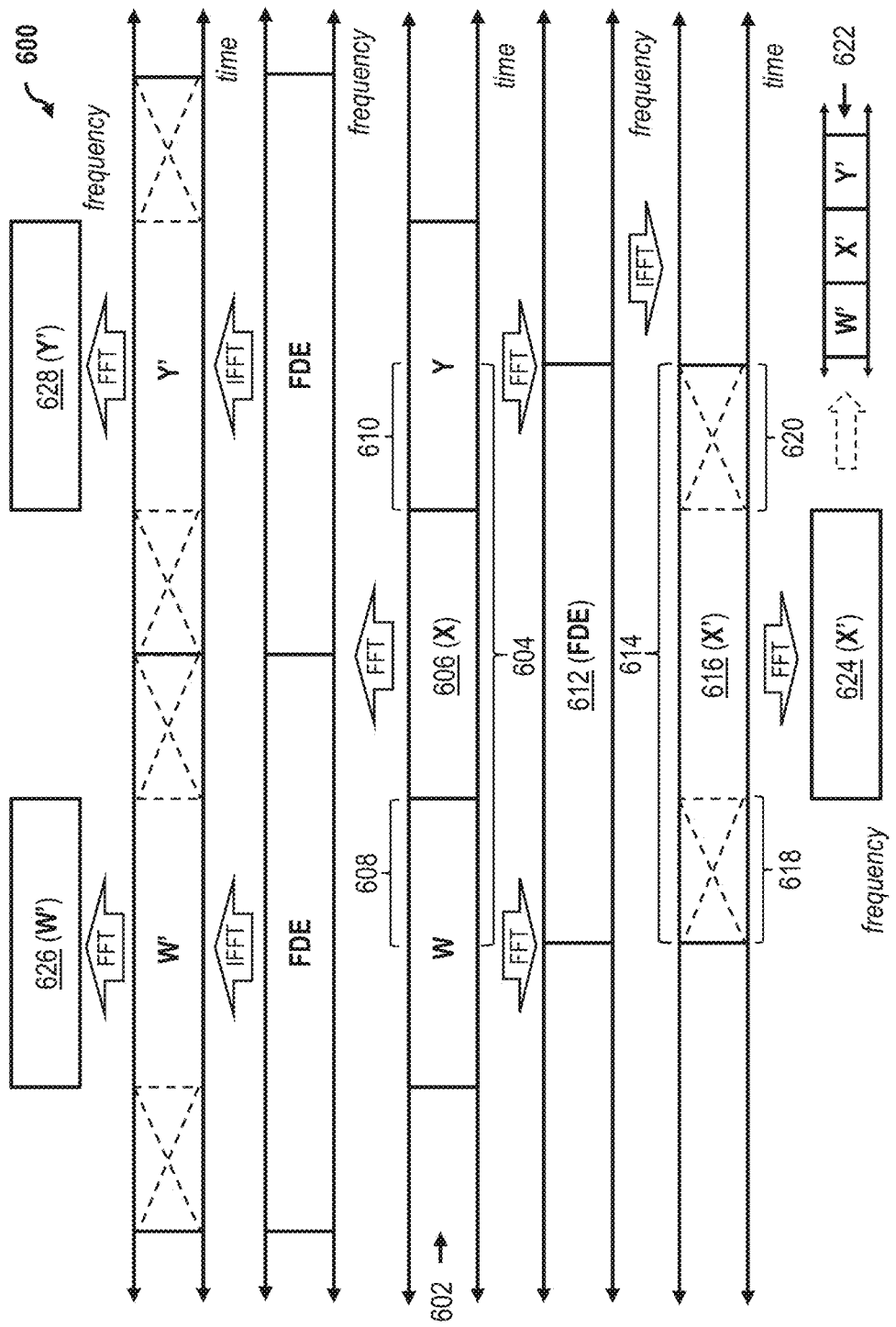
FIG. 6A is a schematic illustration depicting an exemplary equalization scheme utilizing an overlapped Fourier transform, in an alternative embodiment.

FIG. 6A is a schematic illustration depicting an alternative equalization scheme 600 utilizing an overlapped Fourier transform. Similar to equalization scheme 400, FIG. 4, equalization scheme 600 may be implemented in accordance with system 300, FIG. 3, and eliminates the need for cyclic prefixes, implementing frequency domain equalization for computational efficiency on large transforms.

In operation, a receiver (e.g., first receiver 316, FIG. 3) of scheme 600 receives a series of OFDM symbols 602 displayed in the time domain. As described above, in conventional OFDM transmission, the energy transportation problem between blocks of data, also known as inter-block interference (IBI) or "leakage," is addressed by the use of cyclic prefixes. In single-carrier optical implementations, overlap frequency domain equalization (OFDE) has been proposed to eliminate the cyclic prefixes. However, such single-carrier OFDE implementations have not accounted for the variable length of echoes, and particularly the type of echo variability and dispersion that can occur in a multi-carrier system. The conventional OFDE techniques set arbitrary values to the amount of time domain overlap (CP length) based on anticipated chromatic dispersion, and thus may not obtain leakage-free transforms because the echo may be longer than anticipated. Echo energy, for example, may persist longer than the discarded portion 412.

In contrast to these conventional techniques, scheme 600 forms a compound block 604 from OFDM time domain symbols 602 such that compound block 604 is of sufficient size to allow an encountered echo (plus significant recursions, if any) to die out within portions of compound block 604 that may be subsequently discarded after equalization has been performed. Specifically, each compound block 604 of time domain information includes a data portion 606, a pseudo-prefix portion 608, and a pseudo-suffix portion 610. In the exemplary embodiment, the respective sizes of extension portions 608, 610 may be determined independently from the size of data portion 606. Where cyclic prefixes are utilized, the conventional system is required to optimize the trade-off between the package size of the data portion and the amount of the transmission utilized to include the cyclic prefix. According to the present system, on the other hand, this trade-off is eliminated. The pseudo-extensions may be set to any length that is needed to address an encountered echo. The pseudo-extensions may utilize portions, or the entirety, of the data portions of adjacent blocks, and may even include data from more than one adjacent block if such length is necessary.

Furthermore, the size/duration of pseudo-prefix portion 608 may be determined independently from the size of pseudo-suffix portion 610. That is, in some cases, a trailing echo might be of a significantly different duration than a leading echo. A receiver configured according to the present embodiment is thus advantageously configured to be capable of dynamically adjusting each extension portion 608, 610 according to the actual echoes encountered in real time for the respective data portion 606. Extension portions 608 and 610 thus form the overlapping regions of the compound block and, although these portions are not themselves cyclic prefixes, these overlapping portions are further capable of advantageously performing the same functional guard purpose as the cyclic prefix, but without requiring additional transmission time. The overlapping portions 608, 610 represent an extension period of time for echoes to die out that need not be cyclic/cyclical.

In further operation, after OFDM time domain symbols 602 have been formed into compound blocks 604, compound blocks 604 are converted into the frequency domain (e.g., by an FFT), to form compound frequency domain blocks 612, upon which frequency domain equalization (FDE) is then performed, for example, using a complex multiplication on each subcarrier with an inverse channel coefficient. Equalized compound frequency domain blocks 612 are then transformed back into the time domain (e.g., by an IFFT) to form equalized compound time domain blocks 614. Each equalized compound time domain block 614 includes equalized data 616, an equalized pseudo-prefix 618, and an equalized pseudo-suffix 620. The respective equalized pseudo-prefixes 618 and equalized pseudo-suffixes 620 are cut from the equalized compound time domain blocks 614 to extract equalized data 616. Blocks of equalized data 616 may then be pasted together to form a single equalized time domain signal 622, if desired.

The single equalized time domain signal 622 may then be transformed into the frequency domain to form a composite stream of equalized OFDM data, constituted of individual OFDM blocks 624, 626, and 628. That is, the frequency domain composite stream is made up of individual frequency domain blocks (e.g., block 624), which each correspond with a respective data portion (e.g., portion 606). In an exemplary embodiment, individual frequency domain blocks 624, 626, and 628 are pasted together as one sequenced composite block. In an alternative embodiment, each individual frequency domain block 624, 626, 628, etc. is processed separately to determine OFDM signals therefrom. In the exemplary embodiment, equalization scheme 600 considers each compound block 604 in the order of transmission, and thus repeats the process on an ongoing overlapped basis for each following block of the received OFDM time domain signals.

In some embodiments, data portion 606 is anchored according to the center time of the frequency duration equalization signal (e.g., blocks 612), and a de-ghosted time domain signal (e.g., equalized time domain signal 622) is formed by combining the equalized-and-transformed odd and even time domain blocks corresponding to data window portions 606. That is, after frequency domain equalization, the trimmed odd and even blocks of equalized data can be put back together to form an equalized time domain signal. For single carrier, such as pulse amplitude modulation (PAM) signals, the final time domain symbol sequence is considered "clean," and may then be subject to "slicing" and forward error correction (FEC). For OFDM symbols, the final equalized time domain symbol sequence is converted into the frequency domain before slicing and optionally implementing FEC. In DOCSIS implementations, elimination of the cyclic prefix allows for faster data transfer, which would be approximately a 15% improvement for a symbol period of 20 μs and a cyclic prefix of 3 μs.

The techniques described herein may additionally be implemented by the receiver irrespective of what type of signal is, or signals are, received from the transmitter(s). The pseudo-prefixes and pseudo-suffixes are made sufficiently long relative to the duration of the longest echo, and its recursions, and thus the linear distortion from the echo(es) can be completely removed. As described above, because leading and trailing echoes are not necessarily of equal length, the present embodiments realize the additional advantage of allowing the receiver to dynamically adjust the pseudo-prefix independently of the pseudo-suffix to address the actual distortion encountered, and without sacrificing the size of the data package. In some embodiments, an optional windowing function, such as a raised cosine window, may be placed on pseudo-prefix portion 608 and/or pseudo-suffix portion 610 prior to performing FDE.

In at least one embodiment, the size of the pseudo-extensions may be set to a predetermined threshold value that represents a duration of the longest echo expected to be encountered among a system including multiple transmissions from different transmitters (OFDMA). The echo may be determined, for example, from the channel response associated with the respective signal path. In an alternative embodiment, the size of one or more pseudo-extension is set to be greater than a size necessary to remove the distortion from an echo dynamically measured along the path by the receiver during signal characterization. In a further alternative embodiment, the receiver is configured to implement pseudo-extensions of sufficient size to eliminate the distortion from expected echoes on the signal path, and also measure the transmitted signals and dynamically adjust the predetermined size of the pseudo-extensions when encountering an echo having an unexpected length greater than the predetermined threshold.

In at least one embodiment, a frequency domain equalizer is programmed to utilize pilot signals for training prior to frequency domain equalization. In this embodiment, magnitude and phase correction are calculated to render the pilot signals sufficient for use. In one example, continuous pilots are used for synchronization, and timing for the start of a block may be determined by subjecting a set of captured pilots to an IFFT, with a zero value inserted for all data subcarriers, and a resulting time domain impulse response will indicate early or late timing. In at least one alternative embodiment, the time domain signal equalizer is programmed blindly, or using conventional training signals prior to frequency domain equalization. Interpolation of channel response between subcarrier pilots may be used, provided that the pilot spacing is closer than a predetermined minimum value. When the echo duration is longer, for example, the frequency domain ripple will have a shorter period, and should therefore implement closer pilot spacing. In some embodiments, as explained further below in greater detail, cyclic prefixes, pilot signals, and training signals may be completely eliminated through a novel use of constant amplitude zero autocorrelation (CAZAC) function. In the exemplary embodiment, the channel response is determined prior to slicing and FEC. The final equalized and trimmed frequency domain blocks back together to determine the OFDM symbols need not be pasted together (e.g., element 622).

Figure 6B:
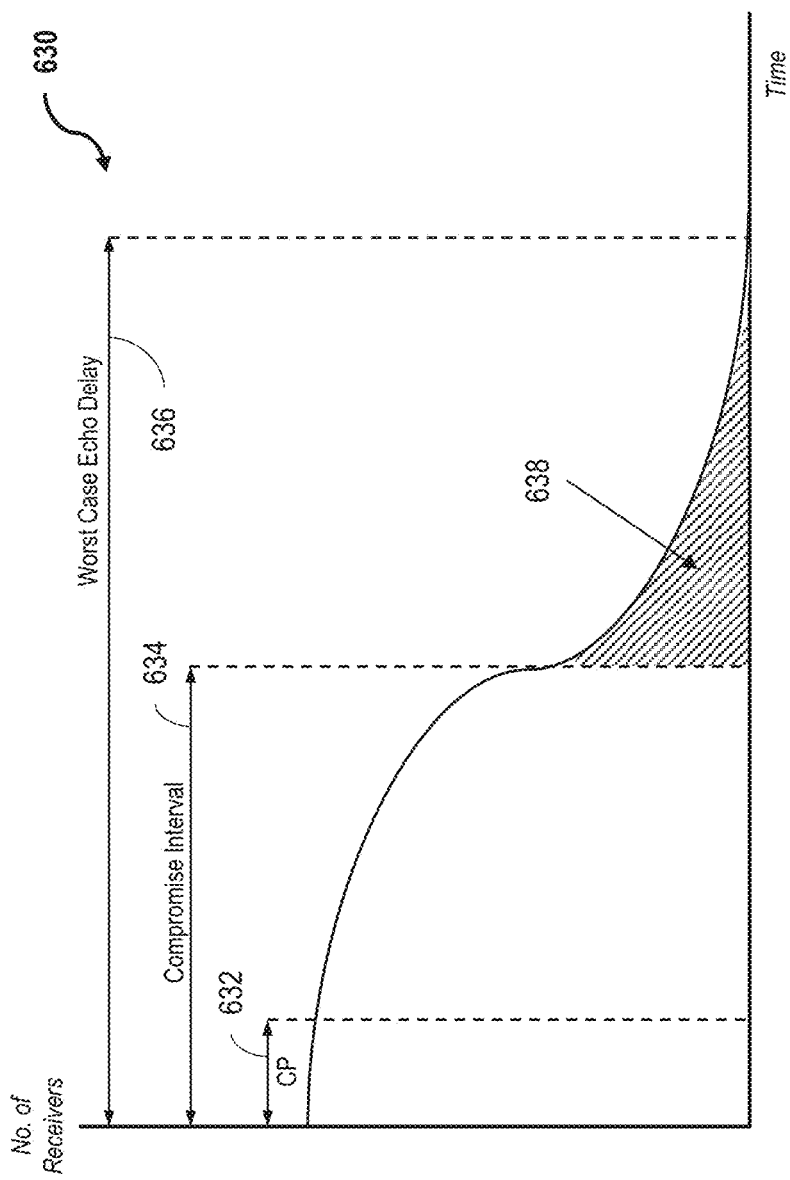
FIG. 6B is a graphical illustration of a histogram depicting a distribution of echo duration for a large population of signal paths.

FIG. 6B is a graphical illustration of a histogram 630 depicting a distribution of echo duration for an increasing population of receivers. More particularly, histogram 630 illustrates, for a large population of receivers, the considerations that must be addressed for echoes of increasing time delays for the receivers to sufficiently function. The distribution curve of histogram 630 might be encountered, for example, in a broadcast signal distribution network, or in the case where a large number of receivers are disposed within a relatively small geographic distance from one another (e.g., a large number of mobile telephones brought into a football stadium or public event). Histogram 630 depicts a first echo time interval 632, a second echo time interval 634, and a third echo time interval 636.

First time interval 632 represents a time delay that could be addressed by a typical conventional cyclic prefix. Second time interval 634 represents the duration of a time delay that could be addressed by a cyclic prefix having a compromise value of increased duration according to the trade-off optimization discussed above. The length of the compromise cyclic prefix might be increased, but at the sacrifice of the size of payload data and the transmission. Beyond the length of second time interval 634, the trade-off between the payload and the guard interval is too great to make further increases in the guard interval practical. Second time interval 634 thus represents the maximum time delay that a conventional system is capable of addressing utilizing a cyclic prefix. Third time interval 636 therefore represents the worst-case echo delay that a system is likely to encounter for receivers in the network, and which require equalization for all of the receivers to properly function. A significant percentage of receivers in the network (represented by hashed area 638 in FIG. 6B) will encounter echoes beyond the maximum capability, i.e. compromise interval length 634, of the conventional system, and will therefore experience equalization difficulties.

Systems and methods according to the present embodiments though, are capable of fully equalizing all of the receivers in the network, and without requiring any consideration of the cyclic prefix length, or the trade-off of the cyclic prefix length against length of the data package. That is, in the conventional system, if a transmitted cyclic prefix is made to sufficiently long enough to equalize the longest echo that can be encountered in the network, the size of the transmitted payload will be too small to make the transmission efficient. As the length of the cyclic prefix is shortened for better transmission efficiency, the number of receivers that will encounter equalization problems increases. Conventional OFDM/OFDMA systems therefore are required to strike a balance between the number of reception sites and poor transmission efficiency. According to the present systems and methods, on the other hand, this balance may be completely ignored. Although the pseudo-extensions of the present embodiments may perform the functions of cyclic prefixes, the pseudo-extensions are not bound by any of the cyclic prefix limitations. The pseudo-extensions are determined independently from the payload/data package, and may even utilize adjacent blocks of payload data as the pseudo-extensions (but discarded after equalization of the desired block).

Some conventional systems have been proposed to eliminate cyclic prefixes from single carrier optical transmissions. These single carrier proposals, however, are unable to cope with channels that fade to zero. That is, division by zero cannot be performed where channel response is zero. In wireless channels, signals from multiple antennas can be combined to produce a composite signal without frequency response nulls. That is because, it two antennas are spaced apart, it is very unlikely that a complete fade will occur at a same frequency for both antennas. Moreover, conventional techniques of eliminating cyclic prefixes only been proposed for single carrier transmissions exhibiting chromatic dispersion on fiber optic lines. Fiber optics, however, do not typically encounter discrete echoes, as described above. Furthermore, OFDM transmission is multi-carrier, and may be implemented on both wired and wireless networks, where echoes may be commonly encountered.

Figure 7:
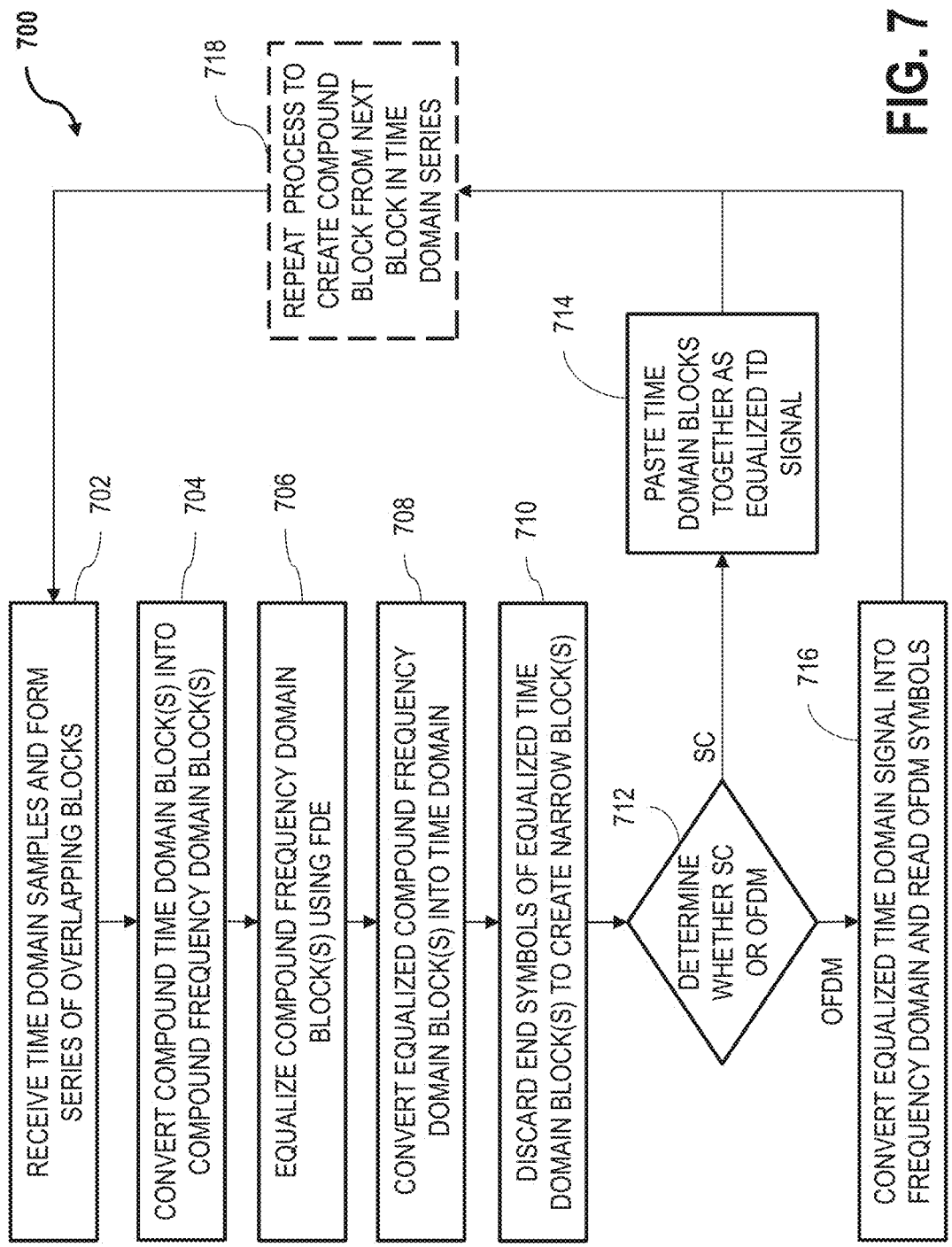
FIG. 7 is a flow chart diagram of an exemplary overlapped Fourier transform process for the embodiment depicted in FIG. 6.

FIG. 7 is a flow chart diagram of an exemplary overlapped Fourier transform process 700 for equalization scheme 600, FIG. 6A. In the exemplary embodiment, process 700 is implemented by a receiver or the processor thereof (e.g., first receiver 316, FIG. 3). Process 700 begins at step 702, in which a digital transmission signal (e.g., OFDM carrier signal 602, FIG. 6) is received, including a series sequential OFDM time domain samples, and formed into overlapping series of compound time domain blocks (e.g., blocks 604, FIG. 6A). In some embodiments, process 700 is particularly useful if the received time domain symbols are from a single carrier transmission, or from a direct sequence spread spectrum transmission. In an optional embodiment, the narrow blocks, such as data portions 606, are centered in the respective compound block 604, and are of sufficient size to allow echoes to die out (e.g., go to zero) in between bursts.

In step 704, the compound time domain blocks are converted into the frequency domain (e.g., by an FFT). In step 706, the frequency domain blocks are equalized using frequency domain equalization. In step 708, the equalized compound frequency domain blocks are converted into the time domain (e.g., by an IFFT) to create equalized compound time domain blocks (e.g., blocks 614, FIG. 6). In step 710, the "early" (e.g., pseudo-prefix 618, FIG. 6A) and "late" (e.g., pseudo-suffix 620, FIG. 6A) time symbol ends are cut/discarded from the equalized compound time domain blocks to extract narrow equalized time domain blocks (e.g., blocks 616, FIG. 6).

Step 712 is a decision step. In step 712, a processor of the receiver determines whether received input symbols are single carrier or multicarrier (OFDM). If the received time domain symbols are determined to be single carrier, process 700 proceeds to step 714, where the narrow equalized time domain blocks are pasted together to form an equalized time domain signal (e.g., signal 622, FIG. 6) and, for single carrier signals (or the equivalent) then sliced and forward error corrected. In at least one example of step 714, where the input symbols are, for example, a direct sequence spread spectrum (not shown), step 714 further includes an optional sub-step of de-spreading the symbols. If, however, in step 712, the processor of the receiver determines that the input signals are multicarrier signals (e.g., OFDM/OFDMA), process 700 proceeds to step 716, where the equalized time domain signal is converted into the frequency domain, after which slicing/FEC may be implemented, and/or OFDM symbols are read therefrom. In some embodiments, narrow blocks may include multiple OFDM transforms, which are separated prior to performing the FFT of step 716. In other embodiments, the narrow blocks may alternatively or additionally include partial OFDM transforms, which are combined to perform the FFT of step 716.

In an alternative embodiment, process 700 further includes optional step 718. Step 718 is implemented in the case where compound time domain blocks form a continuous stream, as opposed to burst mode reception. In such cases, optional step 718 proceeds to the next block in sequential time order and repeats process 700 for the next block. According to process 700, frequency domain equalization can be performed on multiple blocks the same time, and across block boundaries. Alternatively, or additionally, a large block can also be broken into smaller sub-blocks for separate equalization.

According to this advantageous process, a receiver may be configured or programmed to dynamically adjust the size of the compound block according to the length of an encountered echo on the signal path. For example, if a very long echo is encountered in the signal path, the size of the overlapping compound blocks can be enlarged at the receiver end to effectively create longer pseudo-prefixes having a greater duration than the encountered echo. Such dynamic adjustability is particularly advantageous with respect to terrestrial broadcast signals, which are known to suffer from very long echoes in the signal path. The equalization processes described herein are thus effectively modulation-indifferent to the type of data that is being linearized, and thus is fully and simultaneously adaptable to single carrier, multi-carrier, or spread spectrum transmissions. According to the embodiments herein, the data may be continuous, or formed into individual blocks.

Similarly, the size of the transform block may also be dynamically made larger or smaller as desired, and each separate path may be converted by the transform of a different size than that implemented on a different path. This ability to dynamically alter the transform size provides a receiver with superior versatility over conventional OFDE techniques, which implement a one-size-fits-all transform approach. In conventional OFDM transmissions, for example, FFT length is made large in order to prevent the overhead of the cyclic prefix from becoming too burdensome as a percentage of the total transmission time. However, phase noise becomes more unstable as the length of the transform increases. The present embodiments address this problem by both (i) rendering the transform size dynamically adjustable, and (ii) eliminating the need for cyclic prefix transmission at the transmitter end.

Zadoff-Chu Sequence as a Pseudo-Prefix

Figure 8:
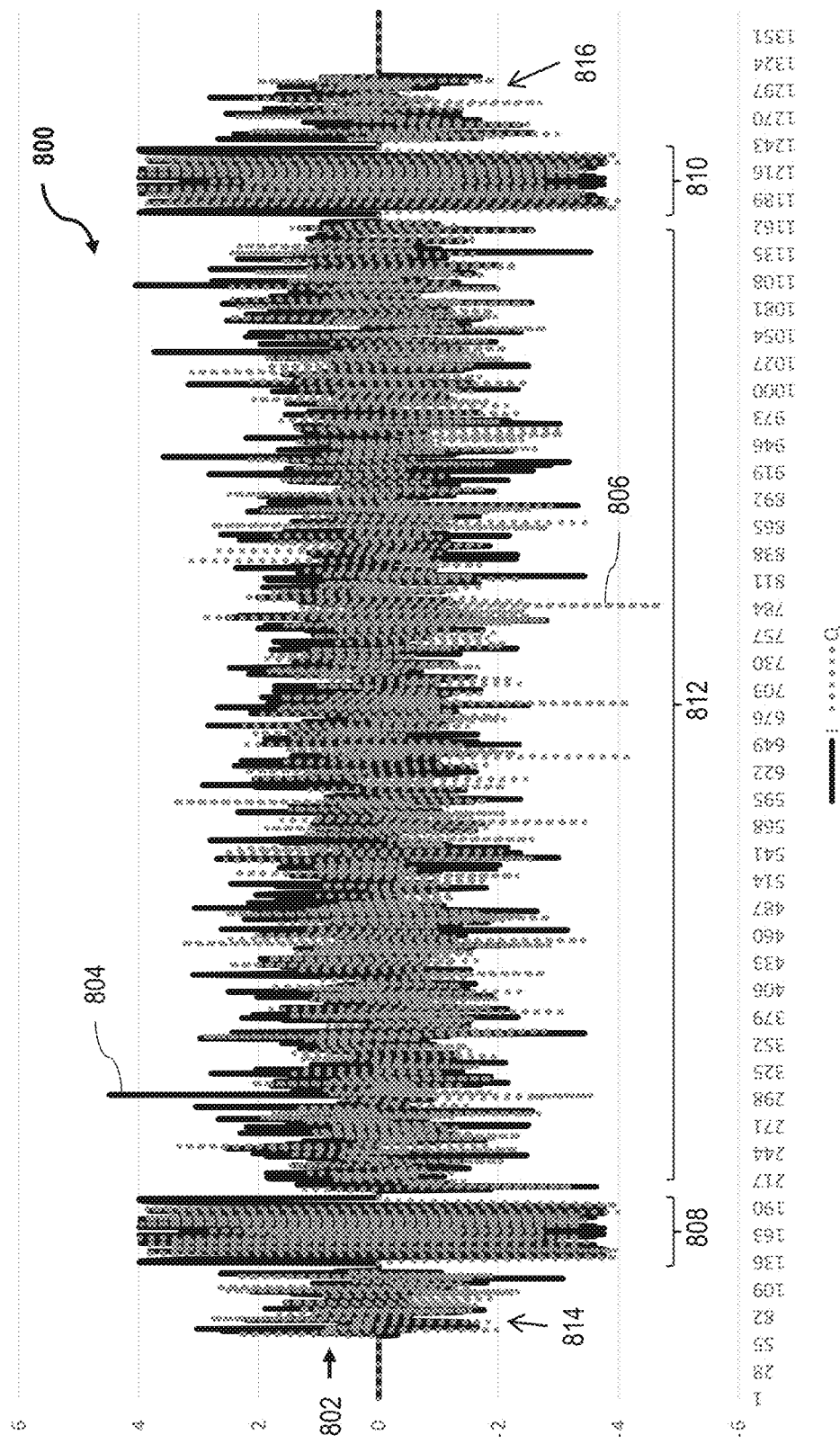
FIG. 8 is a graphical illustration of a plot of a transmitted signal having in-phase and quadrature components, according to an embodiment.

FIG. 8 is a graphical illustration of a plot 800 of an exemplary transmitted signal 802 having in-phase (I) components 804 (black) and quadrature (Q) components 806 (gray). Signal 802 may be used, for example, as a demonstration signal. Plot 800 depicts linear voltage over time of captured signal 802. The I and Q components are also sometimes referred to as the real and imaginary samples, respectively, and orthogonal to one another. In this example, plot 800 is obtained from a test system using a software-defined radio (SDR, not shown) as a transmitter, which is an Ettus (National Instruments) model B200. Another B200 SDR is used as a receiver (also not shown), which will introduce frequency error due to the different oscillators of the SDRs. The test system receiver captures at 8 million samples per second (i.e., an 8 MHz channel), and transmitted signal 802 includes a group of 15 contiguous OFDM blocks 812, each 64 symbols wide (i.e., subcarrier spacing of 125 kHz). In the example illustrated in FIG. 8, testing was performed at a center frequency of 840 MHz and 2.4 GHz, with bandwidths of both 8 MHz and 16 MHz.

In the test system this example, transmitted signal 802 further includes a first CAZAC function 808 and a second CAZAC function 810. As illustrated in FIG. 8, first and second CAZAC functions 808, 810 are Zadoff Chu sequences placed on either end of the 15 OFDM data sequences 812 therebetween. A Zadoff Chu sequence is a particular type of CAZAC function that has no crest factor, and operates as a constant envelope time domain waveform. In operation, the Zadoff Chu sequence waveforms 808, 810 are captured from the antenna periodically from transmitted signal 802, which then allow the determination of the offset frequency, the start of the OFDM block, and the channel characterization.

More particularly, the Zadoff Chu sequences 808, 810 operate as a sync/timing signal to establish an exact offset frequency difference between the transmitter and receiver by a time domain cross-correlation process. Cross-correlation provides exact timing and establishes the precise start of each of the 15 OFDM blocks 808. Accordingly, the use and placement of the Zadoff Chu sequences 808, 810 serves a threefold function: (i) offset frequency measurement; (ii) start of block detection; and (iii) channel response determination for equalization coefficients.

In operation, plot 800 is representative of either a wireless or wired transmission, and measurement of the frequency differences between the transmitter and the receiver carriers is performed by cross-correlating the time domain Zadoff Chu sequences 808, 810 to produce a cross-correlation with real and imaginary components measured at peak values. Accordingly, a time domain phase error between Zadoff Chu sequences 808, 810 is the arctangent of the imaginary value divided by the real value. Frequency error may then be eliminated by de-rotating the captured complex samples, and then the OFDM block group 812 may be parsed to create 15 complex time domain blocks, which, as described with respect to the embodiments above, may include the selected OFDM block, part of a previous OFDM block, and part of the subsequent OFDM block. As also described above, such portions of the previous and subsequent blocks may include other OFDM data signals themselves, all or part of the Zadoff Chu sequences 808, 810, or no energy (quiet time) etc. In an alternative embodiment, data sequences 812 include one or more of single carrier blocks, dead-air (quiet) time, direct-sequence spread spectrum, or any other type of mixed signals experiencing the same linear distortion. That is, linear distortion can be removed from any signal transmitted in the block allocated to data sequences 812.

Similar to the processes described above (see e.g. FIGS. 6-7), all 15 of the compound time domain blocks may then be further converted into the frequency domain, equalized, converted back into the time domain, trimmed to become narrow, equalized, time domain blocks, and finally (e.g., for OFDM signals, as described above) converted into the frequency domain where the component OFDM symbols may be determined. This example, frequency domain equalization coefficients may be determined by performing a Fourier transform/FFT on first Zadoff Chu sequence 808, and then performing a complex division by a stored complex coefficient for each symbol (in frequency). In some embodiments, the compound blocks will require more coefficients than the particular frequency domain equalization coefficients provided in the Zadoff Chu sequence (64 in this example), and therefore the equalization solution is interpolated to create at least twice the number (e.g., 128) of frequency domain coefficients.

In an exemplary embodiment, the combination of the Zadoff Chu sequence 808 and OFDM block group 812 forms a trained block group (not separately numbered). In this example, a continuous transmission may therefore be created by transmitting a series of such trained block groups. Alternatively, a burst mode transmission may be created by transmitting a single trained block group, followed by a single ZC sequence for frequency offset estimation. In at least one embodiment, a plurality of quiet time symbols (e.g., 8 symbols) are placed on either side of both Zadoff Chu sequences 810, 812, to further prevent energy from some data symbols contaminating the channel characterization results.

In at least some embodiments, because an initial Zadoff Chu sequence (e.g., sequence 808) is effectively repeated (e.g., sequence 810) for a single block of OFDM signals, the CAZAC functions/Zadoff Chu sequences according to plot 800 may perform further advantageous utility as a substitute for cyclic prefix, or pseudo-prefix, for transmission implementations that still intend to utilize cyclic prefixes. That is, the Zadoff Chu sequence may be utilized as a substitute cyclic prefix (because it is repeated energy), in addition to the functionality described above, namely, offset frequency measurement, block start detection, and use as a training signal. Accordingly, implementation of the present Zadoff Chu sequence techniques allows for not only the substitution for other types of transmissions, but also for the improvement of OFDM transmissions that still desire to utilize cyclic prefixes.

Therefore, cyclic prefix elimination provides greater data throughput to the transmission system as a whole, and the utilization of the Zadoff Chu sequences instead of the cyclic prefixes provides a more accurate offset frequency estimation. Additionally, utilization of the high-energy, no crest factor Zadoff Chu sequences instead of pilot signals provides a cleaner, less noisy channel model. Accordingly, systems and methods according to the present embodiments realize significantly improved performance over conventional OFDM transmission schemes that utilize cyclic prefixes and/or pilots, because the Zadoff Chu sequence has a zero dB crest factor (as compared with the 10-16 dB factor of OFDM), and therefore allows a stronger signal that can be used for timing, characterization, and frequency offset, thereby resulting in longer battery life, greater range, and greater throughput of system receivers, which is particularly important for portable handheld devices (e.g., cellular phones, tablets, portable computers, etc.). Moreover, elimination of the cyclic prefix is of particular importance at the transmitter and as well, because it will result in significant power savings, thereby delaying the need for plant upgrades, while allowing for improved service tiers.

FIG. 9 is a computer program listing 900 demonstrating an exemplary coding for implementing the Zadoff Chu sequence depicted in FIG. 8. According to listing 900, a computer code generates 63 complex Zadoff Chu values. A $64^{th}$ Zadoff Chu point is created by repeating the $63^{rd}$ Zadoff Chu value. Accordingly, a radix 2 FFT operation may be implemented as listed. The person of ordinary skill in the art will understand though, that in FFT operation may be implemented for other base values, or prime numbers, without departing from the scope of the embodiments described. In an exemplary embodiment, computer program listing 900 is based on a C code programming language, but other programming languages, including Matlab may also or alternatively be used.

The Zadoff Chu sequences herein represent complex-valued mathematical sequences which, when applied to radio signals, give rise to an electromagnetic signal of constant amplitude. Cyclically shifted versions of the Zadoff Chu sequence, imposed on a transmitted signal, thereby result in zero correlation with one another at the receiver. A generated Zadoff Chu sequence that has not been shifted is referred to as a "root sequence".

The Zadoff Chu sequences described herein exhibit a further useful property namely, that cyclically-shifted versions of the sequences are orthogonal to one another, provided, that is, that each cyclic shift, when viewed within the time domain of the transmitted signal, is greater than the combined propagation delay and multi-path delay-spread of that transmitted signal between the transmitter and receiver. In wireless implementations, such as MIMO, equalization of several signals, received from several antennas, is performed to produce one or more equalized data streams. Such MIMO operations are more advantageously performed utilizing the Zadoff Chu sequence embodiments described herein, since application of the present Zadoff Chu sequences to different signals from the different MIMO antennas will assist in matrix construction.

In the exemplary code listed in FIG. 9, the particular set of values used for Nzc, u, n1, and n2 (e.g., C code) produces a complex signal with a constant magnitude in the time domain, and nearly-constant values in the frequency domain. Accordingly, Zadoff Chu sequences further operate similarly to a useful training signal that can be used in place of the pilots that are conventionally used in OFDM. Because of the constant amplitude property, the Zadoff Chu sequences, the resultant time domain signal of the sequences has a crest factor of 0 dB, as described above. The present embodiments are therefore of particularly advantageous use with respect to power-limited transmitters, such as found in cellular phones, because the radiated energy for characterizing the signal path is much greater, while the resulting noise contamination of the channel estimate is significantly reduced.

Figure 10:
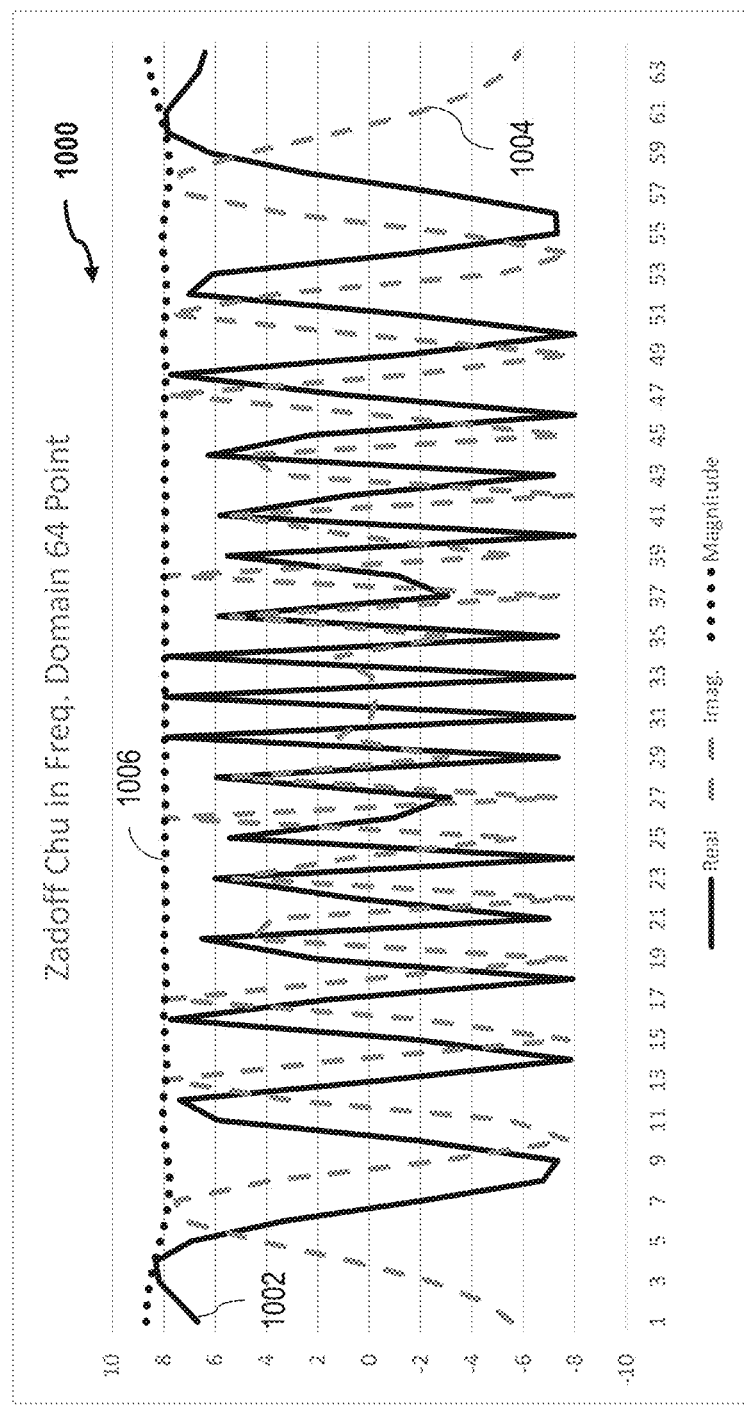
FIG. 10 is a graphical illustration depicting a frequency domain spectral plot of the Zadoff Chu sequence depicted in FIG. 8.

FIG. 10 is a graphical illustration depicting a frequency domain spectral plot 1000 of the Zadoff Chu sequence depicted in FIG. 8, and generated according to computer program listing 900, FIG. 9. Plot 1000 depicts magnitude, real, and imaginary values (y-axis) over frequency (x-axis) of captured spectral data of an FFT of a generated time domain Zadoff Chu sequence. Plot 1000 includes a real subplot 1002, and imaginary subplot 1004, and a magnitude subplot 1006. As described above, such as Zadoff Chu sequences have ideal autocorrelation functions, low crest factors, and relatively flat spectral energy. That is, magnitude subplot 1006 remains relatively flat over significant frequency range, thereby rendering the Zadoff Chu sequence particularly advantageous as a channel characterization signal. The Zadoff Chu sequence therefore may be used, according to the embodiments described above, as a substitute for conventional OFDM pilot signals and training signals. In some embodiments, the spectral energy of the transformed time domain Zadoff Chu sequence can be created from other values of Nzc, including 127, 255, 511, etc., where Nzc=2^n−1. As described above, OFDM blocks 814 and 816 were included as portions of the previous and subsequent signal, respectively, and each illustrate the time and shape of OFDM time domain energy in a single block. It may be further noted that the OFDM energy has a large crest factor.

Figure 11:
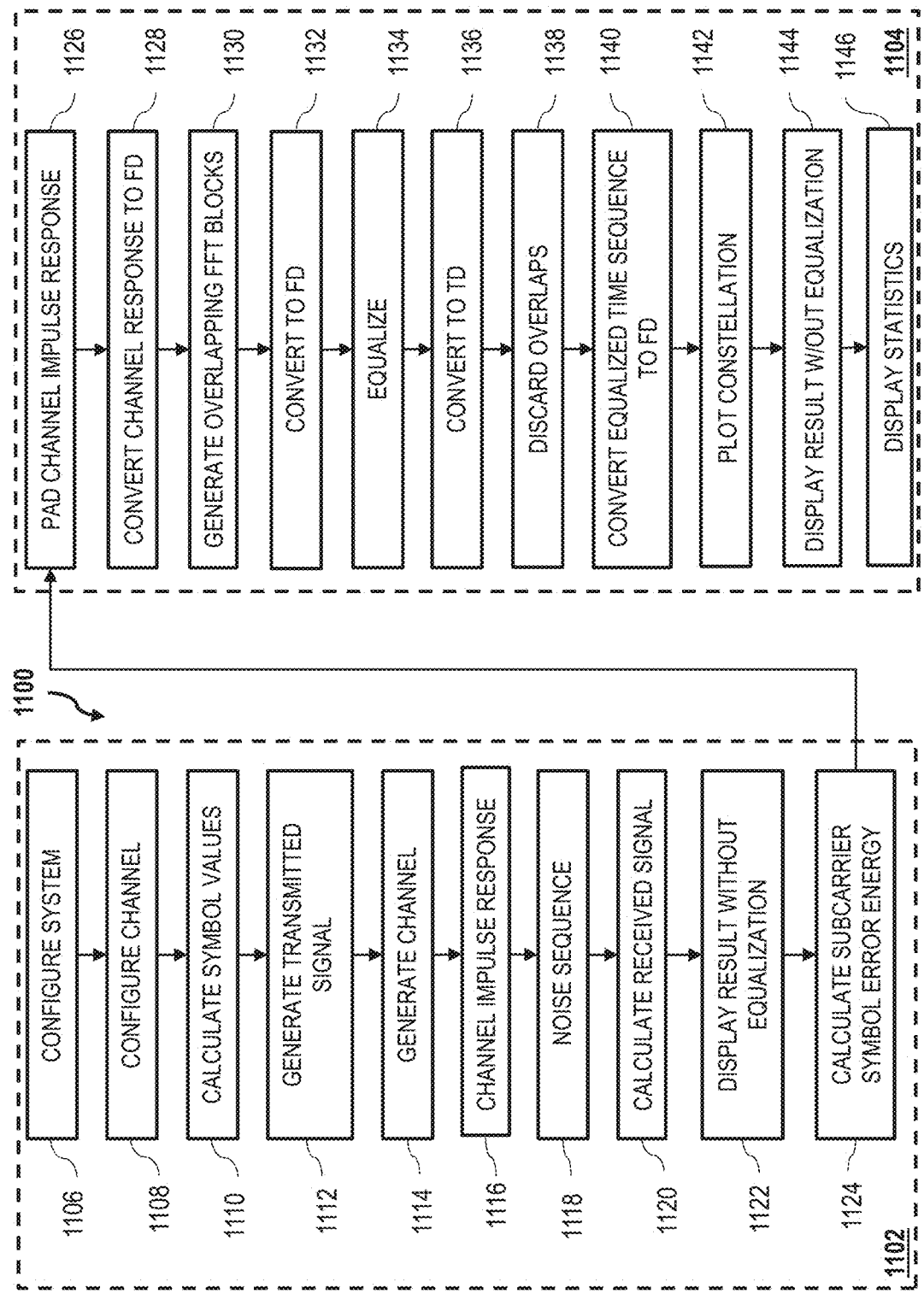
FIG. 11 is a flow chart diagram of an exemplary process for simulating an idealized transmitter-receiver chain for an OFDM transmission having no cyclic prefix, according to an embodiment.

FIG. 11 is a flow chart diagram of an exemplary process 1100 for simulating an idealized transmitter-receiver chain for an OFDM transmission having no cyclic prefix (or pilot signals), including any of the embodiments described above. Process 1100 includes a configuration subprocess 1102, and a frequency domain equalization subprocess 1104. Process 1100 begins at step 1106 of configuration subprocess 1102.

In step 1106, process 1100 performs system configuration, including without limitation the symbol time (e.g., 20 μs), the FFT size (e.g., 4096), sub symbol times, the number of sequential OFDM symbols to simulate (in some cases, process 1100 will discard the first and last simulated OFDM symbols). The modulation order (e.g., 1024 QAM) is set. In step 1108, process 1100 performs channel configuration, including without limitation the channel type (e.g., AWGN channel with a single echo), signal to noise ratio, echo amplitude relative to the direct signal amplitude, and/or echo time delay (e.g., in seconds). In step 1110, process 1100 calculates subcarrier values, including without limitation the number of unique complex symbol values, the average symbol energy, and/or the average noise energy per subcarriers symbol.

In step 1112, process 1100 generates the transmitted signal. The generated transmitted signal includes generated random symbols for the real component, and random generated symbols for the imaginary component. In some embodiments, step 1112 includes the further substeps of combining the real and imaginary components, performing an IFFT of each symbol to convert to the time domain, and reorganizing into a one-dimensional time sequence. Step 1114, process 1100 generates the channel, including without limitation a conversion of the echo (in dB) into a linear quantity, and a conversion of the echo delay into a sub-symbol index.

In step 1116, process 1100 establishes the channel impulse response. In an exemplary embodiment, establishing the channel impulse response includes substeps of starting with all zero values, adding a 1 value at the zero-lag tap, and adding the echo at a desired or appropriate tap. In step 1118, process 1100 establishes the noise sequence (e.g., AWGN), and in step 1120, process 1100 calculates the received signal. In an exemplary embodiment, step 1120 includes substeps of convolving the transmitted signal with a channel impulse response, and trimming the resulting convolution down to its original length and adding the noise sequence thereto.

In step 1122, process 1100 displays the resulting signal as if no equalization had been performed thereupon. In an exemplary embodiment, step 1122 includes the additional substeps of performing an FFT to convert the signal to the frequency domain, and plotting the constellation with associated formatting. Step 1124, process 1100 calculates the average subcarrier symbol error energy. In an exemplary embodiment, step 1124 includes the additional substep of calculating the MER with no equalization. After step 1124, process 1100 proceeds to frequency domain equalization subprocess 1104.

Frequency domain equalization subprocess 1104 begins at step 1126. In step 1126, process 1100 pads the channel impulse response to equal two times more than the FFT size of the OFDM transmission. In an exemplary embodiment, step 1126 limits the echo delay to no more than two times the FFT size of the OFDM. In step 1128, process 1100 converts the channel response into the frequency domain.

In step 1130, process 1100 generates overlapping FFT blocks. In an exemplary embodiment, step 1130 generates overlapping FFT blocks that are two times the FFT size of the OFDM transmission. In step 1132, the overlapping blocks are converted into the frequency domain. In step 1134, the channel response is equalized. In step 1136, the equalized channel response is converted back to the time domain. In step 1138, the overlapping block portions are discarded. In step 1140, the equalized time sequence is converted to the frequency domain.

In step 1142, the resulting constellation is plotted and displayed. In step 1144, additional statistics are displayed with the resulting constellation, including without limitation the MER, which is calculated for each OFDM symbol. According to the example he process of FIG. 11, a transmitter-receiver chain for a digital transmission system is successfully simulated to demonstrate implementation, for optimization purposes, of the several embodiments described above.

Figure 12:
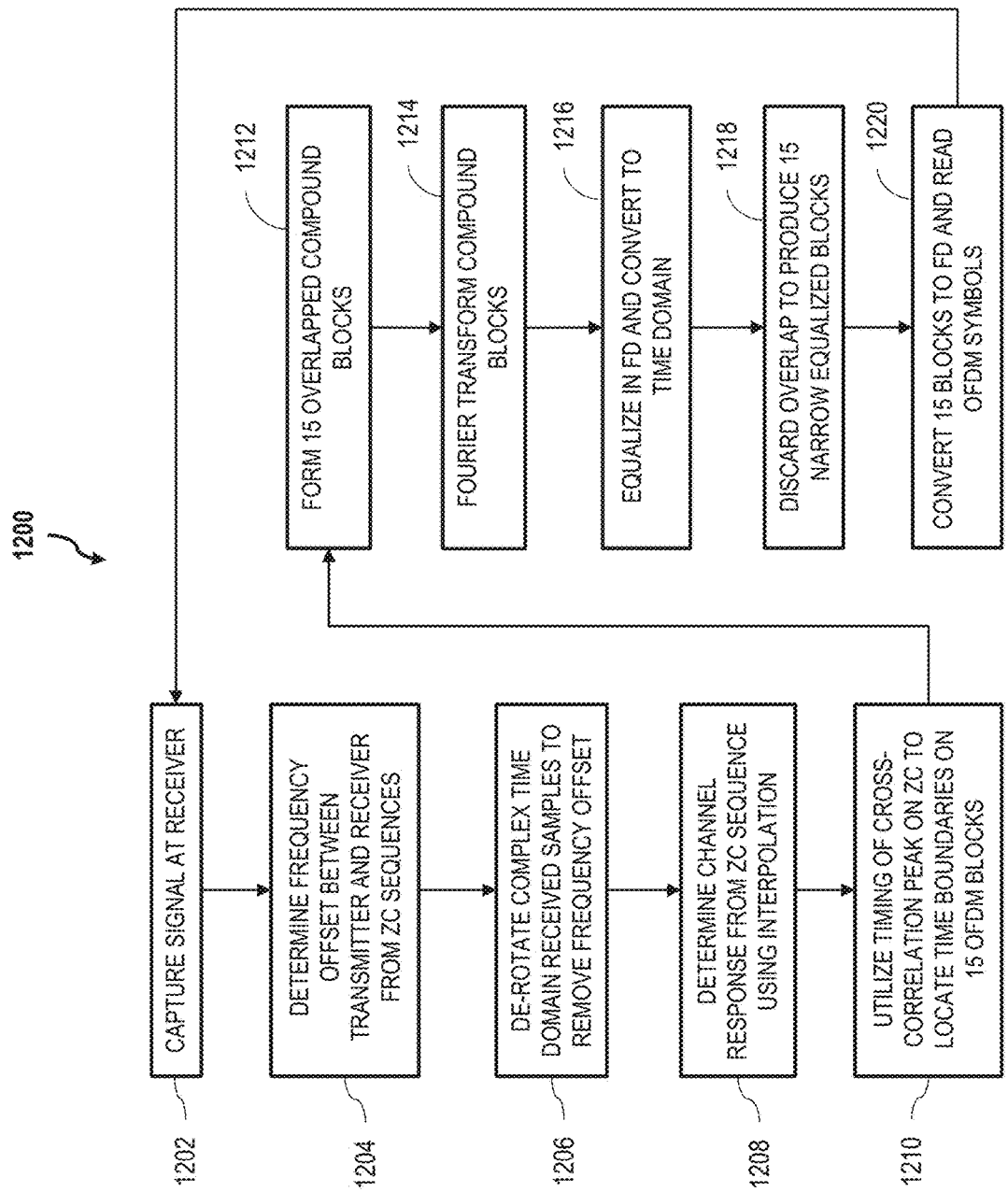
FIG. 12 is a flow chart diagram of an alternative process for a simulated transmitter-receiver chain for an OFDM transmission having no cyclic prefix, according to an embodiment.

FIG. 12 is a flow chart diagram of an alternative process 1200 for utilizing Zadoff Chu sequences according to the embodiments described above. Process 1200 begins at step 1202 in which the receiver (e.g., receiver 316 or 318, FIG. 3) captures a wireless signal (e.g., signal 800, FIG. 8) and stores captured time domain symbols into a memory (not shown in FIG. 3) of the receiver. In step 1204, process 1200 determines the frequency offset between the transmitter and receiver from the detected Zadoff Chu sequences (two Zadoff Chu sequences in the example depicted in FIG. 8), and cross-correlates the Zadoff Chu sequences to produce a peak, and the phase between real and imaginary components identifies the offset frequency.

In step 1206, the captured symbols are de-rotated in the time domain to remove the frequency error from the captured symbols. That is, the received complex time domain samples are de-rotated to remove the frequency offset. In step 1208, the first of the two Zadoff Chu sequences is processed to determine the channel response. In at least one example of step 1208, process 1200 further interpolates the determined channel response in the frequency domain. In step 1210, process 1200 utilizes the timing of the cross-correlation peak of the Zadoff Chu sequences to identify, or locate, the boundaries of each of the 15 OFDM blocks (e.g., blocks 812, FIG. 8).

In step 1212, overlapped compound blocks are formed (e.g., 15 in the example illustrated in FIG. 8). In at least one example of step 1212, the first and last blocks of the compound blocks include portions of the respective Zadoff Chu sequences, which may be later discarded as needed pseudo-extensions, according to the embodiments described above. In step 1214, the compound blocks (e.g., 15) are converted into the frequency domain by a Fourier transform. In step 1216, frequency domain equalization is performed on each the 15 compound blocks, and then the FDE-equalized blocks are converted into the time domain by an inverse Fourier transform. In step 1218, overlapping portions of the equalized, compound time domain blocks are discarded to extract 15 narrow, equalized blocks in the time domain. In step 1220, the extracted narrow blocks are converted into the frequency domain by Fourier transform, after which, the symbols thereof may be sliced and read.

Similar to the embodiments described above, upon completion of step 1220, process 1200 may return to step 1202, in which processing is repeated on the next captured burst, or the next group of previously captured symbols, stored in the receiver memory. As also described above, and an optional embodiment, process 1200 may be performed out of sequence, and/or in near simultaneity, on two or more symbols stored in the memory.

According to the advantageous systems and methods herein, receiver-based processing techniques may be implemented such that the transmitter may eliminate cyclic prefixes from multi-carrier digital signal transmissions. These techniques are thus applicable for equalizing/de-ghosting not only OFDM and OFDMA signals, but also for a variety of other digital transmissions, including without limitation SC-FDMA, single-carrier transmissions, spread spectrum signals, MIMO, and wavelet-based signals.

The techniques of the present embodiments are also particularly applicable to transmission systems that utilize pre-distortion, such as upstream DOCSIS 3.1. That is, in such transmission systems, the cyclic prefix may be entirely eliminated from the pre-distorted transmission, which would not generally be processed by the CMTS receiver. DOCSIS 3.0, for example, utilizes pre-distortion for single carrier transmissions, and DOCSIS 3.1 utilizes pre-distortion for OFDMA transmissions. In conventional examples of these transmission systems, the transmissions are pre-distorted at the cable modem (CM), and after passing through the linear distortion of an upstream cable network, arrive at a CMTS receiver fully equalized. In one illustrative example, a human eye lens pre-distorts an image such that the image will be in generally perfect focus on the eye retina. In further examples, pre-distortion coefficients are determined in a training process, referred to as "ranging," using pilots. According to the embodiments herein, for OFDMA transmissions, the CP may be eliminated at the CM end, thereby providing up to an additional 25% more upstream throughput. Further to this example, no additional equalization processing would be necessary at the CMTS receiver, utilizing the techniques described herein.

As described above, the several embodiments use different types of overlapped extensions as pseudo-prefixes/pseudo-suffixes, and these pseudo-extensions may include one or more of several other types of transmissions, such as training signals, pilots, signals with other modulation formats, quiet time, unused or too-short cyclic prefixes, or CAZAC functions/sequences. These pseudo-extensions are multi-functional, and may substitute for cyclic prefixes or other types of guard transmissions and pilot signals.

Systems and methods according to the present embodiments represent further significant improvements over conventional transmission schemes by providing dynamically adaptive equalization schemes that allow for different transform sizes to be applied to different signals traveling along different signal paths of varying lengths. That is, size of an FFT is adjustable for longer echo/reflection delays, as opposed to the shorter path of the direct signal. Similar advantages apply to the dynamically adjustable lengths of the pseudo-extensions as well.

In the case of OFDMA transmissions where multiple transmitters, having different respective signal paths, contribute to a composite received signal, the frequency domain symbols of each transmitter may be equalized with frequency domain coefficients specifically configured to correct for the signal path of that respective transmitter. An example of relevant equalization processing is described below with respect to FIGS. 13A-13B.

FIG. 13A is a flow chart diagram of an alternative process 1300 for operating a receiver, e.g., first receiver 316, FIG. 3, that receives approximately simultaneous signals (e.g., composite signal 320) from two different signal paths, e.g., first carrier signal 310(1) and second carrier signal 312(1). The respective signal paths of carrier signals 310, 312 may be different for a number of reasons, such as due to a reflector in one path (e.g., reflecting object 324) that is not in the other path. In this example, first transmitter 302 and second transmitter 306 are OFDMA transmitters, no cyclic prefixes are included in the respective carrier signals.

FIG. 13B is a graphical illustration of alternative frequency plots 1302 utilizing an odd-and-even subcarrier scheme 1304 and an upper-and-lower frequency band scheme 1306, respectively. In the embodiments illustrated in FIGS. 13A and 13B, receiver 316 is pre-programmed to know which subcarriers (A and B, respectively, each OFDMA transmitter 302, 306 is using. In subcarrier scheme 1304, first transmitter 302 utilizes odd-numbered subcarriers A and second transmitter 306 utilizes even-numbered subcarriers B. In alternative subcarrier scheme 1306, first transmitter 302 utilizes the lower half of the OFDMA frequency band, and second transmitter 306 utilizes the upper half of the OFDMA frequency band.

Referring back to FIGS. 3 and 13A, process 1300 begins at step 1308. In step 1308, receiver 316 forms a combined (e.g., from composite signal 320) compound overlapped block that includes subcarriers from at least two separate transmitters, that is, first transmitter 302 and second transmitter 306, in this example. In step 1310, the combined compound overlapped block is converted from the time domain into the frequency domain (e.g., by a Fourier transform or an FFT), and the respective frequency domain subcarriers A and B are separated according to which transmitter sent the respective subcarriers. The separated frequency domain subcarrier symbols are then processed similarly, but separately, as follows.

In step 1312, FDE is applied to the symbols from both of the A and B subcarriers using equalization coefficients corresponding to each of the respective signal paths 310(1) and 312(1). In step 1314, the equalized A and B symbols are converted, separately, into the time domain (e.g., by an inverse Fourier transform or IFFT). In an embodiment, for the A subcarriers, a value of zero may be inserted for all subcarriers from B, and similarly, for the B subcarriers, a value of zero may be inserted for all subcarriers from A. In step 1316, still in the time domain, the overlapped portions (pseudo-extensions) of the equalized and converted composite A and B blocks are discarded to create two separate narrow A and B blocks. Step 1318 is an optional step, which may be implemented in the case where the processed symbols are from an OFDMA transmission. In an example of step 1318, the narrow A and B blocks are transformed again into the frequency domain (e.g., by Fourier transform, FFT) and the symbols are read.

The techniques of FIGS. 13A-B are further advantageous with respect to SC-FDMA transmissions that do not utilize cyclic prefixes. In such cases, where the input signal is SC-FDMA, optional step 1318 would not be needed. The present embodiments are particular useful in the case of multiple transmissions of different types. That is, for example, where first transmitter 302 implements an OFDMA transmission and second transmitter 306 implements an SC-FDMA transmission, receiver 316 is configured to receive a composite signal containing different A and B subcarriers, and then separately process the respective symbols thereof. In this example, optional step 1318 would be implemented to read the symbols of the narrow A blocks (OFDMA), but would not need to be implemented for the narrow B blocks (SC-FDMA). This could happen, for example, if B blocks came from a battery-powered device, and A blocks came from a device connected to the AC power supply, and was not therefore power-constrained.

Thus, in the case of a composite signal having multiple transmissions, which may or may not individually include cyclic prefixes, the cyclic prefixes become irrelevant. The significant factor will be the duration of the reflections (e.g., the longest echo) among the multiple transmissions. More importantly, where cyclic prefixes are implemented, the duration of a cyclic prefix for particular transmission would not be expected to change for the particular carrier in which it is implemented. Echoes and reflections, on the other hand, are subject to change from path to path, and over time within a single path. According to the present embodiments though, a receiver can be configured to dynamically adjust, in real-time, the length of the overlap/pseudo-extensions according to the conditions that are actually encountered.

U.S. Pat. No. 5,886,749 describes a system where repeated energy (an NTSC horizontal sync signal) is used to enable an overlapped transform with FDE. The present embodiments advantageously utilize a periodically repeated ZC sequence instead of the NTSC sync signal to more reliably enable an overlapped transform with FDE. Nevertheless, as described above, the present embodiments avoid the need for repeated (e.g., cyclic) energy. The present systems and methods advantageously utilize energy adjacent to the target block, such as an adjacent block itself, which does not affect the equalized target block because the adjacent signal portions are discarded after processing.

Further advantages of the present embodiments become readily apparent in the case where one transmitter's signal arrives early or late relative to the other transmitter's signal. If there was a timing offset between the start of the A block and the B block, this timing offset would be automatically corrected by the FDE subprocess, because the time shift will appear as a rotation in the frequency domain correction coefficients.

The present embodiments offer still further advantages with respect to the use of the present Zadoff Chu sequences as training signals. That is, equalization of conventional OFDM or OFDMA blocks is more effectively executed by substituting a CAZAC functions/Zadoff Chu sequences for pilot subcarriers. According to the present embodiments, even when the substitute (ZC) training signal is shorter in duration than the compound block that is intended to be transformed and equalized in the frequency domain, the frequency domain coefficients may nevertheless be interpolated in order to equalize the overlapped frequency domain extensions.

In some embodiments, in the case of a series of OFDMA block transmissions, the present systems and methods advantageously allow for use of the cyclic prefix (or quiet time) on the first block on the first transmitter, so that the first transmitter is protected from a previous signal echo from another signal path. Successive blocks from this first transmitter may then advantageously omit the use of the cyclic prefix, thereby saving significant transmission time for substantive data.

The present embodiments that eliminate cyclic prefixes from digital transmission signals are still further useful beyond simply reducing transmission time to improve system efficiency. Indeed, the present embodiments are particularly valuable for implementations where the length of echoes on a signal path render the use of cyclic prefix impractical, thereby limiting the types of transmission schemes that may be utilized on such signal paths. For example, in the case of a particular signal path having a duration of 50 μs for its longest echo, and for a maximum allowed overhead of 10%, the OFMD symbol period would have to be greater than 500 μs. A 500 μs symbol, however, would require an inordinately expensive precision local oscillator. Such precision local oscillators become even more costly at very high frequencies, such as millimeter wave frequencies (e.g., 60 GHz). According to the present systems and methods though, by eliminating the need for cyclic prefixes, OFDM transmission technology may be implemented on this exemplary signal path without requiring such costly hardware outlays.

Although specific features of various embodiments may be shown in some drawings and not in others, this is for convenience only. In accordance with the principles of the systems and methods described herein, any feature of a drawing may be referenced or claimed in combination with any feature of any other drawing.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a programmable logic unit (PLU), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the term processor and processing device.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A digital transmission system, comprising:
a transmitter configured to transmit orthogonal frequency-division multiplexing (OFDM) symbols having no cyclic prefix attached thereto;
a receiver for receiving the transmitted OFDM symbols from the transmitter; and
a signal path for communicating the transmitted OFDM symbols from the transmitter to the receiver,
wherein the OFDM symbols received by the receiver include linear distortion from the signal path, and
wherein the receiver is configured to process the received OFDM symbols and linear distortion using an overlapped circular convolution function to produce equalized OFDM symbols, and
wherein the overlapped circular convolution function is configured, to equalize a particular OFDM symbol of the received OFDM symbols, to utilize (i) a trailing portion of an immediately preceding OFDM symbol, and (ii) a leading portion of an immediately following OFDM symbol.

2. The system of claim 1, wherein the trailing portion is of a different size than the leading portion.

3. A digital transmission system, comprising:
a transmitter configured to transmit orthogonal frequency-division multiplexing (OFDM) symbols having no cyclic prefix attached thereto;
a receiver for receiving the transmitted OFDM symbols from the transmitter; and
a signal path for communicating the transmitted OFDM symbols from the transmitter to the receiver,
wherein the OFDM symbols received by the receiver include linear distortion from the signal path,
wherein the receiver is configured to process the received OFDM symbols and linear distortion by an overlapped Fourier transform function to produce equalized OFDM symbols, and
wherein the overlapped Fourier transform function is configured to (i) overlap individual ones of the distorted OFDM symbols with overlapped time energy from respectively adjacent ones of the distorted OFDM symbols, (ii) transform the overlapped individual distorted OFDM symbols into distorted frequency domain symbols, (iii) perform complex multiplication of the distorted frequency domain symbols by equalization coefficients to equalize the distorted frequency domain symbols, (iv) remove the overlapped time energy from a time domain component of the equalized frequency domain symbols, and (v) produce undistorted frequency domain symbols from a frequency domain component of the time domain component with the overlapped time energy removed.

4. A digital transmission system, comprising:
a transmitter configured to transmit (i) a series of orthogonal frequency-division multiplexing (OFDM) symbols having no cyclic prefix attached thereto, and (ii) at least one constant amplitude zero autocorrelation waveform sequence (CAZAC) sequence;
a receiver for receiving the transmitted series of OFDM symbols and the CAZAC sequence from the transmitter; and
a signal path for communicating the transmitted series of OFDM symbols and CAZAC sequence from the transmitter to the receiver,
wherein the series of OFDM symbols and the CAZAC sequence are received by the receiver with linear distortion from the signal path, and
wherein the receiver is configured to utilize the received CAZAC sequence (i) as a reference signal to identify a timing start of a finite group of OFDM blocks within the series of OFDM symbols, and (ii) for equalizing the finite group of OFDM blocks within the received series of OFDM symbols.

5. The system of claim 4, wherein the CAZAC sequence comprises at least one Zadoff Chu sequence.

6. The system of claim 5, wherein the at least one Zadoff Chu sequence comprises a first Zadoff Chu sequence preceding the finite group of OFDM blocks in a time domain and a second Zadoff Chu sequence succeeding the finite group of OFDM symbols in the time domain.

7. The system of claim 4, wherein the receiver is further configured to determine from the received CAZAC sequence at least one of a channel characterization, and an offset frequency.

8. A method of equalizing a transmitted digital signal, comprising the steps of:
receiving, in a time domain, a sequential series of first, second, and third data blocks of the transmitted digital signal;
forming a compound block in the time domain from the second data block including an end portion of first data block and a leading portion of the third data block;
performing circular convolution on the compound block using a set of equalization coefficients to equalize the compound block in the time domain;
extracting from the equalized compound block a narrow block corresponding to equalized time domain data of the second data block;
converting the narrow block from the time domain into frequency domain data; and
reading frequency domain symbols relating to the second data block from the converted narrow block.

9. The method of claim 8, further comprising a step of forming a compound block in the time domain from the third data block including an end portion of second data block and a leading portion of a fourth data block immediately succeeding the third data block.

10. The method of claim 8, wherein the transmitted digital signal is an orthogonal frequency-division multiplexing (OFDM) signal, and wherein the frequency domain symbols are OFDM symbols.

11. A method of equalizing a digital signal transmitted over a signal path, comprising the steps of:
receiving, in a time domain, a sequential series of time domain samples of the transmitted digital signal;
forming the received sequential series of time domain samples into a separate sub-series of overlapping compound time domain blocks, wherein each compound time domain block of the sub-series includes a pseudo-prefix comprising information from an immediately preceding block;
determining an echo delay on the signal path;
converting the compound blocks into the frequency domain to form compound frequency domain blocks;
equalizing the compound frequency domain blocks to form equalized frequency domain blocks;
converting the equalized frequency domain blocks into the time domain to form equalized time domain compound blocks;
discarding, from the equalized time domain compound blocks, overlapping time domain energy portions corresponding to respective equalized pseudo-prefixes, to form narrow equalized blocks;

pasting the narrow equalized blocks together to form a composite equalized time domain signal; and converting the composite equalized time domain into the frequency domain and read equalized frequency domain symbols therefrom.

12. The method of claim 11, wherein the digital signal is an orthogonal frequency-division multiplexing (OFDM) signal, and wherein the equalized frequency domain symbols are OFDM symbols.

13. The method of claim 11, wherein the step of determining comprises one of (i) performing signal characterization for the signal path and (ii) assigning a pre-determined threshold value for the echo delay.

* * * * *